US012711474B2

(12) United States Patent
Lupowitz et al.

(10) Patent No.: US 12,711,474 B2
(45) Date of Patent: Aug. 18, 2026

(54) COMPUTER-BASED PLATFORMS AND SYSTEMS FOR ASYNCHRONOUS PARALLEL NETWORK INSTRUCTION ARCHITECTURE AND METHODS OF USE THEREOF

(71) Applicant: Tassat Group Inc., New York, NY (US)

(72) Inventors: Kevin Lupowitz, New York, NY (US); Eric Couillard, New York, NY (US); Glendy Kam, New York, NY (US); Andre Frank, Irvington, NY (US); Sanjaya Kulkarni, Edison, NJ (US); Joe Grastara, Toms River, NJ (US)

(73) Assignee: Tassat Group Inc., New York, NY (US)

( * ) Notice: Subject to any disclaimer, the term of this patent is extended or adjusted under 35 U.S.C. 154(b) by 259 days.

(21) Appl. No.: 18/301,642

(22) Filed: Apr. 17, 2023

(65) Prior Publication Data

US 2023/0334447 A1 Oct. 19, 2023

Related U.S. Application Data

(60) Provisional application No. 63/331,731, filed on Apr. 15, 2022.

(51) Int. Cl.

*G06Q 20/10* (2012.01)
*G06Q 20/36* (2012.01)
*G06Q 20/40* (2012.01)

(52) U.S. Cl.

CPC ......... *G06Q 20/10* (2013.01); *G06Q 20/3672* (2013.01); *G06Q 20/401* (2013.01); *G06Q 2220/00* (2013.01)

(58) Field of Classification Search

CPC .. G06Q 20/10; G06Q 20/3672; G06Q 20/401; G06Q 2220/00; H04L 9/50; G06F 21/64
See application file for complete search history.

(56) References Cited

U.S. PATENT DOCUMENTS 10,540,654 B1 * 1/2020 James .................. G06Q 20/223
10,721,065 B2 * 7/2020 Treat ................... H04L 67/1095
(Continued)

FOREIGN PATENT DOCUMENTS

WO WO-2007035126 A1 * 3/2007 ............. G06F 12/10
WO WO-2016204790 A1 * 12/2016 .............. G06F 16/11
WO WO-2020042929 A1 * 3/2020 ............. G06Q 20/40

*Primary Examiner* — Jahed Ali
(74) *Attorney, Agent, or Firm* — GREENBERG TRAURIG, LLP

(57) ABSTRACT

A system having at least one processor of a distributed common entity platform, wherein the at least one processor is configured to perform steps to receive a transfer instruction associated with a transfer of a quantity of an asset from a sending entity platform to a receiving entity platform; execute a transfer manager self-executing programming object (SEPO) in response to a first function identifier to execute transfer management operations on a distributed ledger, managed by the distributed common entity platform; wherein the transfer management operations comprise executing an address SEPO in response to a second function identifier of a second instruction to execute address verification operations on the distributed ledger; minting at least one token in a sending wallet associated with the sending wallet address, wherein the at least one token comprises a tokenized version of the quantity of the asset based at least in part on the asset identifier and the quantity value, and transferring the at least one token from the sending wallet to a receiving wallet associated with the receiving wallet address.

22 Claims, 9 Drawing Sheets

(56) References Cited

U.S. PATENT DOCUMENTS 10,915,578 B1* 2/2021 Hunter .................. H04L 67/133
11,334,883 B1* 5/2022 Auerbach ............ G06Q 20/223
11,361,289 B1* 6/2022 Housser ............. G06Q 20/0655
11,416,848 B1* 8/2022 Shetti ................. G06Q 20/3678
11,475,442 B1* 10/2022 James ................ G06Q 20/3829
11,651,353 B1* 5/2023 Cook ................... G06Q 20/401
705/68
11,909,860 B1* 2/2024 So .......................... G06Q 40/06
12,033,120 B1* 7/2024 Stroke ................ G06Q 20/0658
2019/0205932 A1* 7/2019 Ericson .............. G06Q 20/0658
2019/0303892 A1* 10/2019 Yantis ................ G06Q 20/3825
2019/0334726 A1* 10/2019 Kelly .................... H04L 9/3247
2020/0396065 A1* 12/2020 Gutierrez-Sheris ..... H04L 12/46
2021/0073287 A1* 3/2021 Hunter .................. H04L 67/133
2021/0083872 A1* 3/2021 Desmarais ............ H04L 9/0894
2021/0241243 A1* 8/2021 Wiklof ............... G06Q 20/0655
2022/0023742 A1* 1/2022 Tran ........................ A63F 11/00
2022/0300949 A1* 9/2022 Sundararajan ..... G06Q 20/3827
2022/0318752 A1* 10/2022 Bailey .................... G06Q 10/10
2022/0398572 A1* 12/2022 Lee ...................... G06Q 20/389
2023/0080808 A1* 3/2023 Padmanabhan ...... G06Q 20/405
705/64
2023/0095965 A1* 3/2023 Mee ...................... H04L 9/0643
713/168
2023/0139343 A1* 5/2023 Patra ....................... G06F 21/64
705/74
2023/0198776 A1* 6/2023 Andrade ............. H04L 67/1097
713/168
2023/0246852 A1* 8/2023 Lupowitz .................. H04L 9/50
713/162
2023/0334447 A1* 10/2023 Lupowitz ............. G06Q 20/401
2024/0039731 A1* 2/2024 Kanovitz .............. H04L 9/3236

* cited by examiner

COMPUTER-BASED PLATFORMS AND SYSTEMS FOR ASYNCHRONOUS PARALLEL NETWORK INSTRUCTION ARCHITECTURE AND METHODS OF USE THEREOF

CROSS-REFERENCE TO RELATED APPLICATIONS

This application claims priority to U.S. Application 63/331,731 entitled "Computer Based Platforms and Systems for Asynchronous Parallel Network Instruction Architecture and Methods of Use Therefore" filed on Apr. 15, 2022, which is incorporated by reference in its entirety herein.

FIELD OF TECHNOLOGY

The present disclosure generally relates to computer-based platforms and/or systems for an asynchronous and parallel instruction architecture for network operations, including parallel initiation and execution of a blockchain operation in parallel with a corresponding network operation where the network operation is performed asynchronously with the blockchain operation for batch processing.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
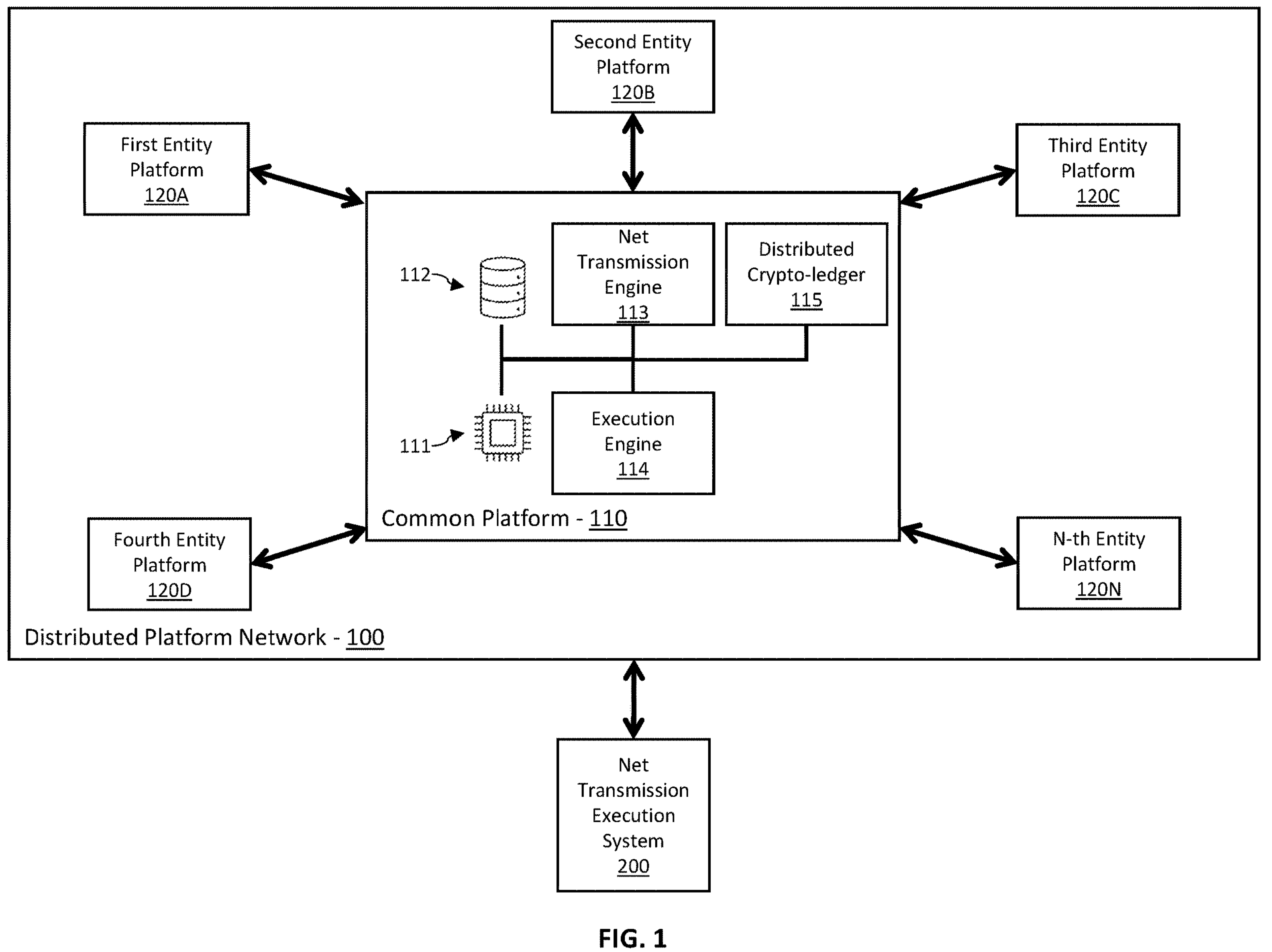
FIG. 1 is a block diagram of a network of platforms for network-wide transmissions of assets and/or tokenized assets between each platform in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of tokenized item operations using parallel networks of a blockchain network and a computer network. The following embodiments provide technical solutions and technical improvements that overcome technical problems, drawbacks and/or deficiencies in the technical fields of distributed cryptographic ledger-based operations, the technical problems, drawbacks and/or deficiencies including instructions to the distributed cryptographic ledger which typically must be synchronized with transfers of tokens on the distributed cryptographic ledger and transfers of underlying assets associated with the tokens.

As explained in more detail, below, technical solutions and technical improvements herein include aspects of improved an improved instruction architecture that enables asynchronous on the distributed cryptographic ledger and off the distributed cryptographic ledger such that instructions managing the transfer of tokens, the transfer of the tokens and the transfer of the underlying assets can be executed asynchronously to separately optimize the efficiency of each, e.g., using parallel networks and/or intelligent batching. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of a network of platforms for network-wide transmissions of assets and/or tokenized assets between each platform in accordance with one or more embodiments of the present disclosure.

In some embodiments, a distributed platform network 100 includes a common platform 110 in communication with a network of platforms including entity platform 120A, entity platform 120B, entity platform 120C, entity platform 120D through entity platform 120N (hereinafter, collectively referred to as "entity platforms 120A through 120N"). In some embodiments, the entity platforms 120A through 120N may be and/or may include nodes in the distributed platform network 100 associated with the common platform 110.

In some embodiments, the common platform 110 may include hardware components such as a processor 111, which may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the common platform 110 may include a datastore 112, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the datastore 112 may include, e.g., a suitable non-transient computer readable medium such as, e.g., random access memory (RAM), read only memory (ROM), one or more buffers and/or caches, among other memory devices or any combination thereof.

In some embodiments, the common platform 110 may implement computer engines for initiating a net transmission to satisfy one or more batches of tokenized asset transfer operations using a net transmission engine 113, executing each individual tokenized asset transfer operation using an execution engine 114, and administer a distributed cryptoledger 115 to record and execute each individual tokenized asset transfer of each individual tokenized asset transfer operation. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some scenarios, local or internal asset movements are more efficient than asset movements to and/or from an external entity, system and/or platform. For example, transferring funds between accounts of a single banking system is faster and more efficient than transferring funds between an account of one banking system to an account of another banking system. Similarly, transferring data files between accounts and/or storage locations of a single database system uses fewer computational and network resources than transferring the same data files to and/or from an external or remote account/storage location.

Therefore, implementing each entity platform 120A through 120N as a node in the distributed platform network 100 enables each entity platform 120A through 120N to initiate transfers of assets across the distributed platform network 100 via a net transmission execution system 200. In some embodiments, in parallel, each entity platform 120A through 120N may access the common platform 110 to transfer tokenized assets associated with each asset being transferred.

In some embodiments, platforms may be linked for communication across multiple networks. In some embodiments, the common platform 110 provides a parallel network for interoperability between entity platforms 120A through 120C. The common platform 110 may include an interoperability layer than can interface with each entity platforms 120A through 120C of member entities, e.g., a first entity platforms 120A through 120C of a first member entity, a second entity platforms 120A through 120C of a second member entity, among other entity platforms 120A through 120C of additional member entities. Communications over a traditional network between the entity platforms 120A through 120C may be slow, costly, resource intensive, or otherwise deficient for continuous and/or real-time interactions between users on different entity platforms 120A through 120C. For example, if a first user intends to perform an operation with a second user, and the first user in the first entity platforms 120A through 120C while the second user is on the second-entity specific platform, the operation may face technical hurdles such as slow communication between the entity platforms 120A through 120C, incompatibilities between data on the first entity platforms 120A through 120C and on the second entity platforms 120A through 120C, third-party operations for facilitating, regulating and performing fraud/security checks on the operation, among other hurdles. Such technical hurdles make performing the operation inefficient and unreliable and with lag between initiating the operation and completion of the operation.

Accordingly, in some embodiments, the first entity platforms 120A through 120C and the second entity platforms 120A through 120C may interface with the common platform 110 to perform parallel real-time operations over a distributed crypto-ledger 115. The distributed crypto-ledger 115 may employ encrypted storage for each entity to effectuate token-based operations between the entities via the use of crypto-tokens that represent the data of the operation between the users.

In some embodiments, the exemplary distributed crypto-ledger 115 may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize self-executing programming objects, e.g., smart contracts, that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the operation may include a transfer of data, such as, e.g., an internet message communication, an SMS/MMS/RCS message, a file transfer, an electronic financial transfer (e.g., a money wire via, e.g., ACH or FedWire, etc.), among other transfers. Accordingly, the entity platforms 120A through 120N may use the common platform 110 to perform parallel transfers of tokenizations of the data for secure, immutable and real-time transfer between the entity platforms 120A through 120N.

In some embodiments, the common platform 110 allows users of a member entity to send confirmed real-time data to users of other member entities. The common platform 110 may convey the data via a tokens or tokenized data representing the data between the member entities. For example, for payment operations, the common platform 110 may use tokens representing currency, such as, e.g., any suitable crypto-tokens, including bitcoin, Ether, Dogecoin, a stablecoin, or other suitable crypto-token or any suitable combination thereof.

Upon transferring the tokens and/or tokenized data between the member entities, the transfer of the original data may be reconciled with the transfer of the tokens and/or tokenized data to verify the completion and integrity of the operation.

In some embodiments, where the operation is a financial monetary transfer, the transfer of the original data may include a physical and/or digital transfer of the currency. Reconciliation of the transfer of the tokens and/or tokenized data and the transfer of the currency may take the form of settlement, e.g., via FedWire. FedWire may be a slow, computationally expensive, and financially expensive such that each operation cannot be feasibly performed in real-time. Thus, common platform 110 provides the real-time transfer which may then be settled after the fact with the transfer of the currency. Accordingly, the transfer of the currency may be performed at any suitable time after the real-time transfer of tokens representing the currency. As a result, currency transfers may be batched based on aggregated amounts between entities to consolidate many transfers into one operation over the network between the entity platforms 120A through 120C.

In some embodiments, the common platform 110 may convey payment instructions between member entities for currency settlement (e.g., US Dollar settlement, or other currency or combination of currencies) between member entities may be performed over FedWire or other suitable wiring service. In some embodiments, the distributed crypto-ledger 115 the common platform 110 utilizes a private permissioned blockchain. In some embodiments, the common platform 110 may issue payment instructions and may utilize tokens that include or do not include stablecoins. In some embodiments, the common platform 110 permits permissioned self-executing programming objects, such as, e.g., smart contracts, and documentation to be attached to the instructions. In some embodiments, the common platform 110 architecture allows third parties to develop permissioned applications (e.g., for vertical markets, healthcare, receivables, mortgages, trade) that benefit from utilizing the common platform 110 infrastructure.

In some embodiments, access to the common platform 110 is limited to regulated member entities. Thus, in some embodiments, every member entity on the common platform 110 is approved by an administrator or group of administrators (such as a Board of Directors) of the common platform 110 and is subject to the governance requirements set by the common platform 110. In some embodiments, every member entity may be required to meet all requirements set by the common platform 110, e.g., regulatory compliance, solvency, transparency, KYC, etc. Additionally, in some embodiments, the common platform 110 will be able to provide Regulators with access to all necessary data for transparency, compliance and regulatory purpose as requested and agreed by the common platform 110 and regulators.

In some embodiments, the regulators may be provided with transparency into the common platform 110 operations as well as operations between the entity platforms 120A through 120C. Thus, regulators are provided with total transparency on all transactions as well as the tokens in the common platform 110 systems, and the assets (e.g., funds) held in the digital inter-entity common platform 110 segregated accounts ("segregated accounts") across member entities and associated entity platforms 120A through 120N of the common platform 110. Accordingly, permissions on the common platform 110 may include requirements of member entities regarding the regulators, such as being in good standing with applicable regulators, submitting to oversight of the requirements for all member entities, including KYC/AML policies, procedures and protocols, ensuring minimum KYC requirements are provided through parameters defined by the administrators of the common platform 110 and the regulators, among other requirements or any combination thereof.

In some embodiments, a user may trigger a transfer instruction, such as a payment instruction, message instruction, data transfer instruction, etc. The transfer instruction may be originated through a member entity's core system (e.g., FIS, FiServ), or through an approved and permissioned platform, including an approved and permissioned payments platform or other platform for performing transfers. In some embodiments, the member entity's platform communicates instructions to the common platform 110 to effectuate the transfer via a token transfer on the distributed crypto-ledger 115. Such an arrangement may enable the member entities to have total transparency into the tokens and the dollars held in segregated accounts across the common platform 110. The transfer may then be settled via batch transfers in parallel, for example using FedWire or other suitable service.

In some embodiments, at regular intervals, there is an automated net settlement between the segregated accounts at member entities. In some embodiments, the common platform 110 may use predictive analytics based on machine learning/AI that include information such as risk tolerance of each member first member entity and transaction history for intraday settlement instruction. In addition, the system may trigger close of day "true-up" settlement instructions that also optimize for parallel network blackouts, so there is no disruption of the common platform 110 service during afterhours/weekends/etc. In some embodiments, in the context of financial transfer, real-time reconciliation of summed segregated accounts to blockchain balance may prove constant 1:1 US Dollar backing.

In some embodiments, every token minted on the distributed crypto-ledger 115 is backed by a corresponding asset unit (e.g., US dollars, corresponding files and/or messages, etc.) in a segregated account at the originating member entity. In some embodiments, receiving member entities (and regulators) have assurance through real-time reporting that every Transfer Token is backed 100% by the asset on deposit in a segregated account at the originating member entity.

In some embodiments, when deposits are made into the segregated account, Transfer Tokens are minted (upon instruction by the system) on the distributed crypto-ledger 115 and the corresponding the asset backing the Transfer Tokens are blocked in the segregated account. Upon receipt of the asset at the receiving entity (e.g., through FedWire for financial transfers) the common platform 110 system may burn (extinguishment) the equivalent number of Transfer Token in the receiving member entity's wallet.

In some embodiments, the distributed crypto-ledger 115 of the common platform 110 may employ distributed crypto-ledger 115-specific crypto-tokens (e.g., "Transfer Tokens") that represent payment instructions. In some embodiments, one transfer token may represent one data item being transferred. For example, 1 transfer token may be equivalent to 1 US dollar. However, other equivalencies may be employed, such as, e.g., 100 transfer tokens may be equivalent to 1 US dollar, or other suitable equivalency. In some embodiments, the transfer tokens only exist at participant member entities within the distributed crypto-ledger 115. Thus, the member entities are not permissioned to self-custody the transfer tokens. Rather, the common platform 110 allows for backing funds in legal tender.

Therefore, in some embodiments, the common platform 110 may use the execution engine 114 to transfer tokenized assets between entity platforms 120A through 120N across the distributed platform network 100. Thus, tokenized assets may be transferred in real-time across the distributed platform network 100 using distributed storage and operations, e.g., using the distributed crypto-ledger 115.

In some embodiments, a sending entity platform may use a respective sending segregated data structure to instruct an asset to be transferred to a receiving entity platform. The common platform 110 may use the execution engine 114 to access and/or create a tokenized asset associated with the asset to be transferred, and execute a transfer of the tokenized asset to a receiving segregated data structure of the receiving entity platform. For example, the execution engine 114 may write, in real-time in response to the instruction to transfer the asset, a cryptographic immutable entry to the distributed crypto-ledger 115, thus reassigning the tokenized asset to the receiving segregated data structure.

In some embodiments, the common platform 110 may implement the execution engine 114 and the distributed crypto-ledger 115 to enable real-time execution of each transfer instructed by each entity platform 120A through 120N on the distributed platform network 100. Thus, secure transfer of the tokenized assets can be efficiently performed.

In some embodiments, the associated assets of the tokenized assets transferred across the distributed platform network 100 may be transferred separately. In some embodiments, a separate net transmission execution system 200 may be employed to transfer assets between entity platforms 120A through 120N. Because the transfer of assets is less efficient and slower than the transfer of tokenized assets using the common platform 110, the transfer of assets can be performed in batches, e.g., at periodic, predetermined and/or dynamically determined intervals of time to satisfy the transfer of tokenized assets representing each asset. In some embodiments, the net transmission engine 113 of the common platform 110 may interface with the entity platforms 120A through 120N and a net transmission execution system 200.

In some embodiments, the net transmission engine 113 may aggregate the transfers of tokenized assets between each entity platform 120A through 120N for a given interval of time and trigger a net transmission to satisfy the transfers with one or more transfers of associated assets or equivalents of the associated assets. For example, in transfers of monetary funds, the tokenized assets may include cryptographic tokens ("crypto-tokens" or "tokens") which are transferred across the distributed platform network 100 in real-time via the distributed crypto-ledger 115. The value of monetary funds may be performed in bulk settlement operations with the net transmission execution system 200 including a monetary settlement system such as, e.g., FedWire or other suitable system.

In some embodiments, the net transmission engine 113 may determine a net quantity, value, amount, magnitude, or other attribute of the transfers of tokenized assets between any two entity platforms 120A through 120N to determine the aggregate assets to transfer between the two entity platforms 120A through 120N. The entity platforms 120A through 120N may communicate with the net transmission execution system 200 according to instructions by the net transmission engine 113 to execute a net transmission the moves the aggregate assets between the two entity platforms 120A through 120N.

In some embodiments, the net transmission engine 113 may determine a time to initiate the net transmissions. For example, the net transmission engine 113 may initiate the net transmissions on a scheduled period of time (e.g., every minute, every five minutes, every ten minute, every 15 minutes, every 20 minutes, every 25 minutes, every 30 minutes, every 45 minutes, every hour, every two hours, every three hours, every four hours, every five hours, every six hours, every seven hours, every eight hours, every nine hours, every ten hours, every 11 hours, every 12 hours, once per day, once per week, once per two weeks, once per month, once per two months, once per three months, once per four months, once per six months, once per year, etc.). In some embodiments, the scheduled period of time may be adjusted and/or configured based on a volume of transfers being conducted over the distributed platform network 100 or by any other suitable metric to balance minimizing a number of net transmissions and minimizing a quantity of unsatisfied tokenized asset transfers, where an unsatisfied tokenized asset transfer refers to a transfer of a tokenized asset(s) without a transmission of the associated asset and/or asset amount/quantity/value/etc.

In some embodiments, the net transmission engine 113 may initiate the net transmissions may dynamically and/or algorithmically determine to initiate a net transmission based on the balance minimizing a number of net transmissions and minimizing a quantity of unsatisfied tokenized asset transfers. For example, where a quantity of unsatisfied tokenized asset transfers to or from a particular entity platform 120A through 120N exceeds a predetermined value, the net transmission engine 113 may initiate the net transmissions, or where a ratio of: unsatisfied tokenized asset transfers from a first particular entity platform to second particular entity platform; and, unsatisfied tokenized asset transfers from the second particular entity platform to the first particular entity platform, exceeds a predetermined value, the net transmission engine 113 may initiate the net transmissions.

Figure 2:
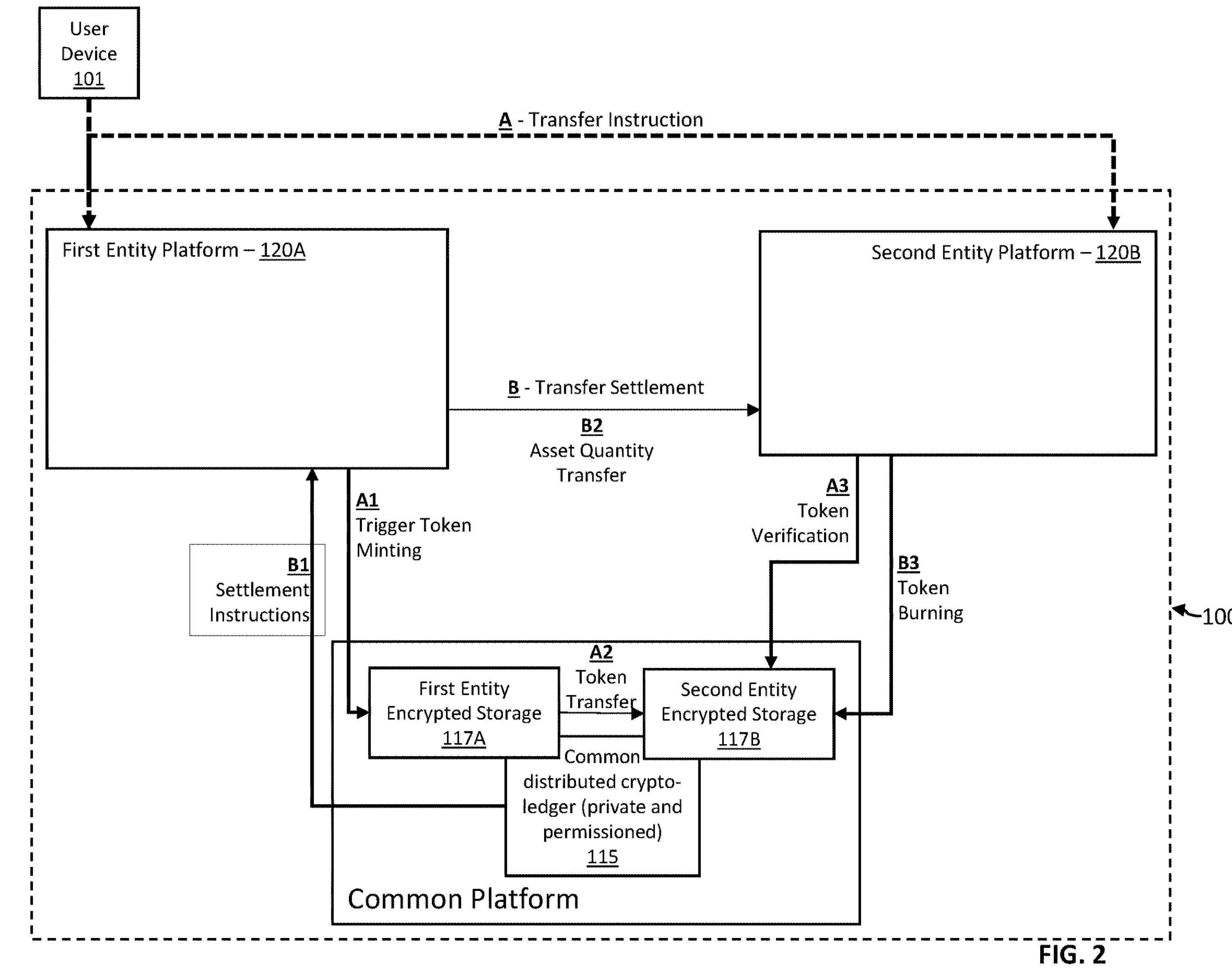
FIG. 2 depicts a diagram of the distributed platform network 100 for implementing transfers of tokens and net transmissions to satisfy a batch of individual transfers of tokens between a first entity platform 120A and a second entity platform 120B in accordance with one or more aspects of embodiments of the present disclosure.

FIG. 2 depicts a diagram of the distributed platform network 100 for implementing transfers of tokens and net transmissions to satisfy a batch of individual transfers of tokens between a first entity platform 120A and a second entity platform 120B in accordance with one or more aspects of embodiments of the present disclosure.

In some embodiments, the distributed platform network 100 may be employed for a transfer of a tokenized asset and net transmission (e.g., settlement) to satisfy a batch of transfers. The transfer may include a first entity platform 120A and a second entity platform 120B.

In some embodiments, the first entity platform 120A and the second entity platform 120B may each include a database schema configured for storing and/or recording assets and asset quantities destined for a recipient in an asset transfer or transmission. For example, first entity platform 120A and the second entity platform 120B may include segregated bank accounts on a network of segregated bank accounts. The database schema may include a customized, e.g., navigational database, hierarchical database, network database, graph database, object database, relational database, object-relational database, entity-relationship database, enhanced entity-relationship database, document database, entity-attribute-value database, star schema database, or any other suitable database schema customized and configured for storing and/or recording assets and asset quantities segregated from the entity of the associated entity platform 120A through 120N and combinations thereof. For example, the database may include database technology such as, e.g., a centralized or distributed database, cloud storage platform, decentralized system, server or server system, among other storage systems.

In some embodiments, the first user may desire to send a quantity of the asset to a second user. Accordingly, the first user may initiate a transfer instruction at process A to initiate the transfer of the quantity of the asset by selecting and/or inputting, via a user interface of a user device 101, user defined parameters defining a movement of the asset from a first entity platform 120A (e.g., from a first user profile hosted thereon) to a second entity platform 120B (e.g., to a second user profile hosted thereon), a quantity of the asset to be moved, among other user defined parameters or any combination thereof.

In some embodiments, the user device 101 may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, in response to the user input and/or selection, the user device 101 may communicate the user defined parameters, e.g., using key-value pairs, structured table or list or vector or array, or any combination thereof, to the first entity platform 120A, to the common platform 110, to a separate application layer and/or application server, or to any other suitable computing system.

In some embodiments, the computing system may receive the user defined parameters and generate a transfer instruction having instruction parameters derived from the user-defined parameters. In some embodiments, the instruction parameters may include a sender network address and recipient network address associated with the first entity platform 120A and the second entity platform 120B, respectively, on the distributed platform network 100. In some embodiments, the sender and recipient addresses may be for the first entity platform 120A and second entity platform 120B, respectively. In some embodiments, the first user profile and the second user profile may have addresses on the distributed platform network 100 or on another network linked to the distributed platform network 100, such as a network internal to the first entity platform 120A and the second entity platform 120B, respectively, or any combination thereof. Accordingly, the sender and recipient addresses may include the addresses of the first user profile and the second user profile.

In some embodiments, the distributed platform network 100 may receive the transfer instruction, including the transfer instruction parameters. In some embodiments, the common platform 110, the first entity platform 120A, and/or a separate application layer and/or application server, or to any other suitable computing system, may receive the transfer instruction. A controller, e.g., of the common platform 110 may control the first entity platform 120A and the second entity platform 120B to perform the transfer instruction (Process A depicted in FIG. 2).

In some embodiments, based on the instruction parameters, the first entity platform 120A, e.g., as instructed by the common platform 110 and/or a controller of the first entity platform 120A, may identify and access the quantity of the asset of the transfer. For example, the quantity of the asset may be moved from the first user profile to a first segregated data structure. In some embodiments, moving the quantity of the asset into the first segregated data structure moves the quantity of the asset from a data structure controlled by the first entity platform 120A to a data structure controlled by the distributed platform network 100. Thus, the quantity of the asset is segregated from the first entity of the first entity platform 120A.

In some embodiments, the common platform 110 may verify the presence of the quantity of the asset in order to ensure a transfer of a token representing a tokenization of the quantity of the asset may be performed across the distributed platform network 100. Moreover, because the first segregated data structure 120A is a node of the distributed platform network 100, including a node on the distributed crypto-ledger 115, the first entity platform 120A may verify the transfer instruction by verifying the quantity of the first asset, and trigger the common platform 110 to mint, at step A2, the token associated with the quantity of the asset.

In some embodiments, the common platform 110 may mint the token in a first entity encrypted storage 117A associated with the first segregated data structure 116A. The first entity encrypted storage 117A may thus hold tokens representative of assets and quantities thereof that are attributable to the first entity platform 120A. In some embodiments, the first entity encrypted storage 117A may include, e.g., a blockchain wallet, or any other suitable cryptographic storage location addressed on the distributed crypto-ledger 115.

In some embodiments, at step 3A, the distributed crypto-ledger 115 may transfer the tokens from the first entity encrypted storage 117A to a second entity encrypted storage 117B. In some embodiments, the second entity encrypted storage 117B is associated with the second entity platform 120B to hold tokens representing the asset available on the second entity platform 120B. In some embodiments, transferring the tokens from the first entity encrypted storage 117A to the second entity encrypted storage 117B represents a movement of the corresponding quantity of the asset from the first entity platform 120A to the second entity platform 120B.

In some embodiments, at step 4A, the second entity platform 120B may verify token delivery to the second entity encrypted storage 117B on the distributed crypto-ledger 115, and accept the transfer. In some embodiments, because the first entity platform 120A and the second entity platform 120B are part of the distributed platform network 100 associated with the common platform 110, the common platform 110 may track and verify, e.g., via the distributed crypto-ledger 115 the attribution to the entity platforms 120A through 120N of assets and quantities thereof. Thus, moving the quantity of the asset into the first entity platform 120A and minting and moving tokens to the second entity encrypted storage 117B may verifiably and immutably transfer attribution of the quantity of the asset to the second entity platform 120B. Thus, security of the transfer of the quantity of the asset may be maintained and actual movement of the quantity of the asset may be moved from the first entity platform 120A to the second entity platform 120B at a later time. Accordingly, the first user may receive system confirmation, via the user device 101, of successful transfer of the quantity of the asset.

In some embodiments, the second entity platform 120B may have a pool or balance of assets stored therein. Accordingly, in response to receiving the token at the second entity encrypted storage 117B, the second entity platform 120B may move a corresponding quantity of a corresponding asset to the second user profile. Thus, the second user may be provided with the quantity of the asset of the transfer instruction due to the transfer of the token representing a tokenization of the quantity of the asset.

In some embodiments, in parallel and asynchronously with Process A, the common platform 110 may also cause the performance of Process B to transfer the quantity of the asset between the first entity platform 120A and the second entity platform 120B to satisfy the transfer of the token. For example, the transfer of the token may be reconciled or settled between the first entity platform 120A and the second entity platform 120B. In some embodiments, to improve the efficiency of the entity platforms 120A through 120N, the common platform 110 and the distributed platform network 100, the movement of the quantity of the asset between the first entity platform 120A and the second entity platform 120B may be aggregated with the movement of other quantities of other assets between the first entity platform 120A and the second entity platform 120B. Thus, the quantities of assets attributed to each of the first entity platform 120A and the second entity platform 120B may be netted to reduce the number of movements, reducing the number of operations required to satisfy the transfer of the tokens.

In some embodiments, to perform the net transmission of Process B, a net quantity of assets associated with multiple transmissions may be determined in order to move multiple digitized assets between the first entity platform 120A and the second entity platform 120B. The multiple transmissions may include the movement of the quantity of the asset, and at least one additional movement of at least one quantity of at least one additional asset. In some embodiments, each movement is associated with a movement between the first entity platform 120A and the second entity platform 120B, where some may include movements from the first entity platform 120A to the second entity platform 120B, while some may include movement from the second entity platform 120B to the first entity platform 120A. In some embodiments, all of the movements may be satisfied and reconciled with associated transfers of tokens in a single net transmission that moves the net quantity.

In some embodiments, the net transmission engine 113 may determine a net quantity, value, amount, magnitude, or other attribute of the transfers of tokenized assets between any two entity platforms 120A through 120N to determine the aggregate assets to transfer between the two entity platforms 120A through 120N. The entity platforms 120A through 120N may communicate with the net transmission execution system 200 according to instructions by the net transmission engine 113 to execute a net transmission the moves the aggregate assets between the two entity platforms 120A through 120N.

In some embodiments, the net transmission engine 113 may determine a time to initiate the net transmissions. For example, the net transmission engine 113 may initiate the net transmissions on a scheduled period of time (e.g., every minute, every five minutes, every ten minute, every 15 minutes, every 20 minutes, every 25 minutes, every 30 minutes, every 45 minutes, every hour, every two hours, every three hours, every four hours, every five hours, every six hours, every seven hours, every eight hours, every nine hours, every ten hours, every 11 hours, every 12 hours, once per day, once per week, once per two weeks, once per month, once per two months, once per three months, once per four months, once per six months, once per year, etc.). In some embodiments, the scheduled period of time may be adjusted and/or configured based on a volume of transfers being conducted over the distributed platform network 100 or by any other suitable metric to balance minimizing a number of net transmissions and minimizing a quantity of unsatisfied tokenized asset transfers, where an unsatisfied tokenized asset transfer refers to a transfer of a tokenized asset(s) without a transmission of the associated asset and/or asset amount/quantity/value/etc.

In some embodiments, the net transmission engine 113 may initiate the net transmissions may dynamically and/or algorithmically determine to initiate a net transmission based on the balance minimizing a number of net transmissions and minimizing a quantity of unsatisfied tokenized asset transfers. For example, where a quantity of unsatisfied tokenized asset transfers to or from a particular entity platform 120A through 120N exceeds a predetermined value, the net transmission engine 113 may initiate the net transmissions, or where a ratio of: unsatisfied tokenized asset transfers from a first particular entity platform to second particular entity platform; and, unsatisfied tokenized asset transfers from the second particular entity platform to the first particular entity platform, exceeds a predetermined value, the net transmission engine 113 may initiate the net transmissions.

In some embodiments, at step 1B, the common platform 110 may provide automated net transmission instructions based on the net quantity for the net transmission. The common platform 110 may provide the net transmission instructions to the nodes of the entity platforms 120A through 120N. The net transmission settles, completes, or otherwise satisfies the transfer of the tokens. In some embodiments, therefore, the common platform 110 (e.g., using the net transmission engine 113) provides settlement instructions to the first entity platform 120A to transfer the quantity of the asset to the second entity platform 120B. For example, where the asset are dollars, the settlement instructions may cause the first entity platform 120A to transfer the dollars via, e.g., FedWire. In some embodiments, the transfer of the quantity of the asset may be combined with other transfers of other quantities of the asset based on other transfers of tokens between the first entity encrypted storage 117A and the second entity encrypted storage 117B. In some embodiments, the quantity of the asset may be netted with the other quantities of assets for a net settlement. In some embodiments, the ensure efficient net settlement, the common platform 110 may utilize metrics such as, e.g., a transfer quotient, predict behavior and/or predicted transfer quotients, segregated account balance, network traffic, time since a previous net settlement, among other metrics to intelligently determine a time for the transfer settlement of process B.

In some embodiments, at step 2B, upon the selection of the time and receiving the settlement instructions, the first entity platform 120A may transfer the netted quantity of the asset to the second entity platform 120B. Thus, the transfer of the quantity of the asset may be performed in parallel with the token transfer along with a transfer of other quantities of the asset to consolidate transfers for more efficient operation and communications.

In some embodiments, at step 3B, the second entity platform 120B may receive the quantity of the asset. As a result, the token transfer may be satisfied, and the second entity platform 120B may trigger the common platform 110 to burn the corresponding tokens from the second entity encrypted storage 117B. In some embodiments, the common platform 110 may constantly or periodically reconcile all segregated data structure balances of assets in real-time to ensure compliance with the token transfer equivalence. This process may also provide the first entity platform 120A with verification of the burning of the associated tokens.

In some embodiments, Process B may include the net transmission between first entity platform 120A and the second entity platform 120B, and/or net transmissions between some or all other entity platforms 120C through 120N of the distributed platform network 100.

Figure 3:
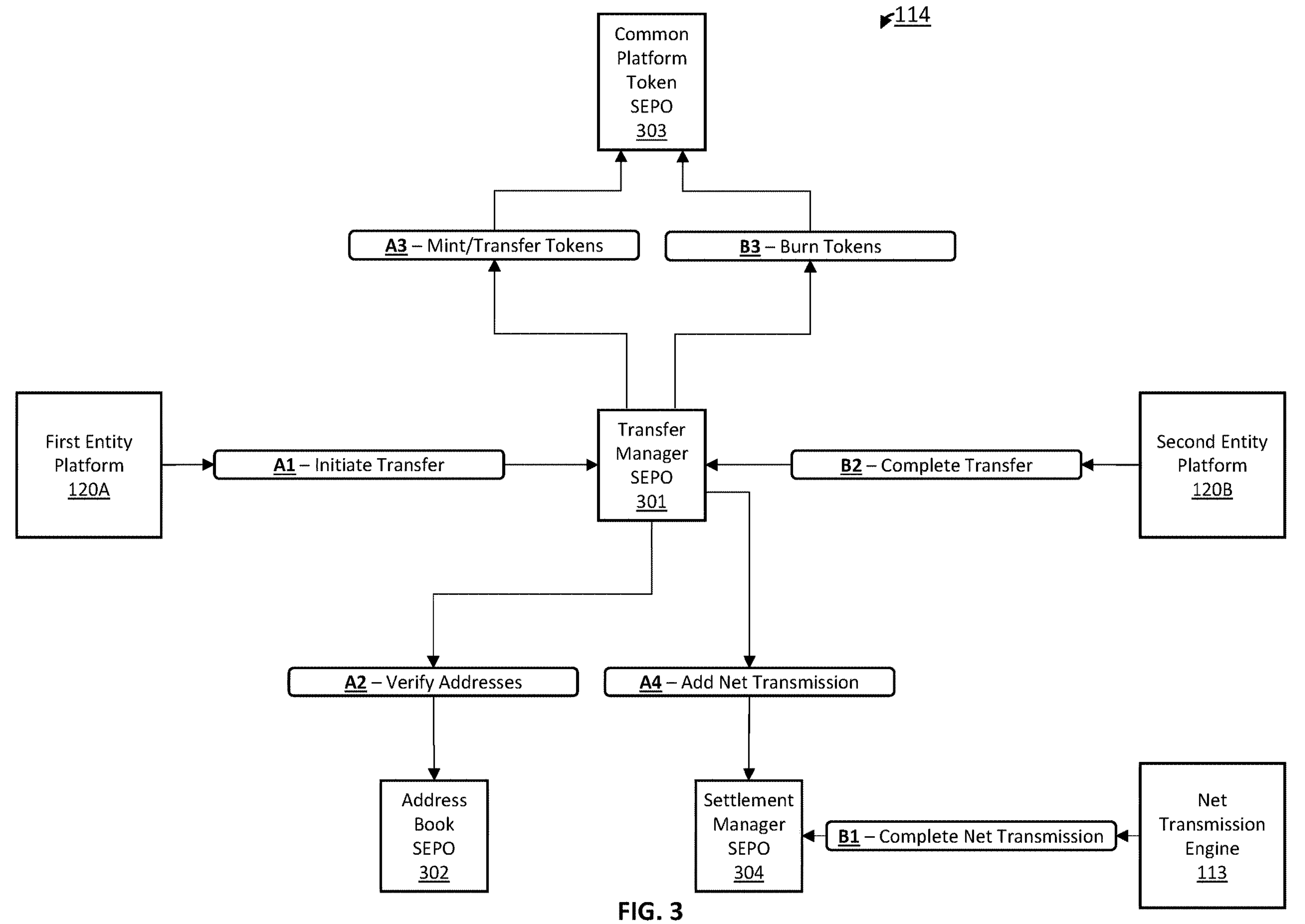
FIG. 3 is a diagram illustrating transfer instructions and orchestration of an asset movement across the distributed platform network 100 using coordinated self-executing programming objects (SEPO) in accordance with one or more aspects of the embodiments of the present disclosure.

FIG. 3 is a diagram illustrating transfer instructions and orchestration of an asset movement across the distributed platform network 100 using coordinated self-executing programming objects (SEPO) in accordance with one or more aspects of the embodiments of the present disclosure.

In some embodiments, to coordinate the automated movement of tokens and assets, the execution engine 114 may implement self-executing programming objects (SEPO) that automatically execute instructions and operations on the distributed crypto-ledger 115. The architecture of the SEPOs of the execution engine 114 enables secure, efficient and asynchronous token and asset transfers by coordinating with off-chain resources via automated instructions.

In some embodiments, upon receiving a selection and/or input by a user from a user device to initiate a transfer of a quantity of assets to a user of the second entity platform 120B, the first entity platform 120A may generate and issue a first instruction A1 to initiate the transfer.

In some embodiments, the first instruction A1 may specify a function caller, a function identifier, parameters of the instruction and returns resulting from executing the instruction.

In some embodiments, the function caller may include the user's profile on the first entity platform 120A. In some embodiments, the function identifier may include an identifier indicating to initiate payment. In some embodiments, the parameters may include a transfer message, a sending address associated with a sender of the quantity of the asset on the sending entity platform, a receiving address associated with a receiver of the quantity of the asset on the receiving entity platform, an asset identifier identifying the asset, a quantity value representing the quantity of the asset, and a first function identifier identifying a first function to be performed, among other suitable parameters. In some embodiments, the returns may include the status of transfer instruction, references (identifiers), among other suitable data for return.

In some embodiments, the transfer message may include, e.g., the sending address, the receiving address, the first entity platform 120A, the second entity platform 120B, a token type to be used to tokenize the asset, the quantity of the asset, a public description, a private description, document references, among other transfer-related data, or any combination thereof.

In some embodiments, the sending address may include a network address on the first entity platform 120A for the sending user, or a network address for the first entity platform 120A, or any combination thereof. In some embodiments, the receiving address may include a network address on the second entity platform 120B for the receiving user, or a network address for the second entity platform 120B, or any combination thereof.

In some embodiments, the transfer manager SEPO 301 may receive the first instruction A1. The transfer manager SEPO 301 may include self-executing programming that automatically executes transfer management operations in response to the first instruction A1 according to the parameters of the first instruction A1. Thus, the transfer manager SEPO 301 may automatically generate a second instruction A2 to identify and/or verify addresses on the distributed crypto-ledger 115 that are associated with the sending address and the receiving address.

In some embodiments, second instruction A2 may specify a function caller, a function identifier, parameters of the instruction and returns resulting from executing the instruction.

In some embodiments, the function caller may include the payment manager SEPO 301. In some embodiments, the function identifier may include an identifier indicating to verify addresses. In some embodiments, the parameters may include receiving address and/or receiving entity platform 120B, among other suitable parameters. In some embodiments, the returns may include address data associated with the distributed crypto-ledger, the address data comprising a sending wallet address associated with the sending address a receiving wallet address associated with the receiving address.

In some embodiments, an address book SEPO 302 may receive the second instruction A2. The address book SEPO 302 may include self-executing programming that automatically executes address verification operations in response to the second instruction A2 according to the parameters of the second instruction A2. Thus, the address book SEPO 302 may access an address log associated with the distributed crypto-ledger. The address log may include address data that maps addresses on the distributed crypto-ledger 115 to names and addresses of the entity platforms 120A through 120N and/or users on each of the entity platforms 120A through 120N. Thus, the addresses of wallets or other encrypted token storages for a sending user/platform and receiving user/platform may be identified for performing a token transfer.

In some embodiments, the address verification operations may include verifying that the sending address and the receiving address are valid based on the address log, and determine the address data associated with the sending address and the receiving address. In some embodiments, the address book SEPO 302 may then return the address, including a sending wallet address of the sending address and a receiving wallet address of the receiving address, to the transfer manager SEPO 301.

In some embodiments, the transfer manager SEPO 301 may automatically execute transfer management operations to generate a third instruction A3 to a common platform token SEPO 303 to execute a transfer of tokens associated with the quantity of the asset.

In some embodiments, third instruction A3 may specify a function caller, a function identifier, parameters of the instruction and returns resulting from executing the instruction.

In some embodiments, the function caller may include the payment manager SEPO 301. In some embodiments, the function identifier may include an identifier indicating to mint tokens. In some embodiments, the parameters may include the sending wallet address, the receiving wallet address, the asset identifier, and the quantity value, among other suitable parameters.

In some embodiments, the common platform token SEPO 303 may receive the third instruction A3. The common platform token SEPO 303 may include self-executing programming that automatically executes network token operations in response to the third instruction A3 according to the parameters of the third instruction A3. Thus, the common platform token SEPO 303 may mint and/or transfer at least one token corresponding to the quantity of the asset on the distributed crypto-ledger 115 based on the parameters of the third instruction A3. In some embodiments, the token may be a tokenized version of the quantity of the asset, e.g., based on the asset identifier and the quantity value. For example, the token may include a hash formed form a cryptographic hash or algorithm using the asset identifier, quantity value, sending address, receiving address, sending wallet address, receiving wallet address, time, date, a nonce, a random number or any other inputs or any combination thereof.

In some embodiments, the network token operations may include minting the token sending wallet associated with the sending wallet address by forming the hash of the token and submitting a transaction to the distributed crypto-ledger 115. The transaction may indicate the minting of the token and a deposit of the token into the sending wallet, thus creating the token on the distributed crypto-ledger 115. The network token operations may then transfer the token to the receiving wallet, e.g., by submitting a transaction to the distributed crypto-ledger 115 that transfers the token from the sending wallet to the receiving wallet.

In some embodiments, the transfer manager SEPO 301 may receive the return from the common platform token SEPO 303. In some embodiments, the transfer manager SEPO 301 may automatically execute transfer management operations in response to the return from the common platform token SEPO 303. The transfer management operations in response to the return may include generating a fourth instruction A4 to a settlement manager SEPO 304 to add a net transmission or settlement entry to a list of pending net transmissions/settlements needed to satisfy token transfers on the distributed crypto-ledger 115.

In some embodiments, fourth instruction A4 may specify a function caller, a function identifier, parameters of the instruction and returns resulting from executing the instruction.

In some embodiments, the function caller may include the payment manager SEPO 301. In some embodiments, the function identifier may include an identifier indicating to add pending settlement. In some embodiments, the parameters may include the sending wallet address, the receiving wallet address, the asset identifier, and the quantity value, among other suitable parameters.

In some embodiments, the settlement manager SEPO 304 may receive the fourth instruction A4. The settlement manager SEPO 304 may include self-executing programming that automatically executes settlement operations in response to the fourth instruction A4 according to the parameters of the fourth instruction A4. Thus, the settlement manager SEPO 304 may generate an entry to a record of pending settlements, where each settlement indicates a transfer of one or more tokens for which the corresponding asset transfer has yet to be executed and/or confirmed.

In some embodiments, the transfer manager SEPO 301 may receive the return from the settlement manager SEPO 304. In some embodiments, in response, the settlement manager SEPO 304 may automatically execute transfer management operations to receive a fifth instruction B1 from the net transmission engine 113 that instructs one or more settlements in the record of pending settlements to be executed and/or confirmed.

In some embodiments, fifth instruction B1 may specify a function caller, a function identifier, parameters of the instruction and returns resulting from executing the instruction. In some embodiments, the function caller may include net transmission engine 113. In some embodiments, the function identifier may include complete settlement. In some embodiments, the returns may include pending settlements list.

The settlement manager SEPO 304 may include self-executing programming that automatically executes settlement operations in response to the fifth instruction B1 according to the parameters of the fifth instruction B1, including reporting the fifth instruction B1 to the transfer manager SEPO 301 along with the parameters of the pending settlement entry. The parameters of the pending settlement entry may include, e.g., the sending wallet address, the receiving wallet address, the token, the asset identifier, and the quantity value among other parameters or any combination thereof.

In some embodiments, the transfer manager SEPO 301 may receive the report of the settlement instruction from the settlement manager SEPO 304. In some embodiments, the transfer manager SEPO 301 may receive a sixth instruction B2 from the second entity platform 120B, where the sixth instruction confirms completion of the transfer of the quantity of the assets from the first entity platform 120A to the second entity platform 120B.

In some embodiments, sixth instruction B2 may specify a function caller, a function identifier, parameters of the instruction and returns resulting from executing the instruction.

In some embodiments, the function caller may include the second entity platform 120B. In some embodiments, the function identifier may include an identifier indicating a complete transfer associated with a transfer of the quantity of the asset. In some embodiments, the parameters may include Transfer identifier, and/or transfer parameters including, e.g., the sending wallet address, the receiving wallet address, the asset identifier, and the quantity value, among other suitable parameters. In some embodiments, the returns may include returning a status including the indication of the completed transfer.

In some embodiments, the transfer manager SEPO 301 may include self-executing programming that automatically executes transfer management operations in response to the sixth instruction B2 according to the parameters of the sixth instruction B2. Thus, in response to the sixth instruction B2, the transfer manager SEPO 301 may automatically execute transfer management operations to generate a seventh instruction B3 to complete the transfer of the token by burning the token from the second encrypted storage associated with the second entity platform 120B on the distribute crypto-ledger 115.

In some embodiments, seventh instruction B3 may specify a function caller, a function identifier, parameters of the instruction and returns resulting from executing the instruction.

In some embodiments, the function caller may include the transfer manager SEPO 301. In some embodiments, the function identifier may include an identifier indicating to burn tokens. In some embodiments, the parameters may include the sending wallet address, the receiving wallet address, the asset identifier, and the quantity value, among other suitable parameters.

In some embodiments, the common platform token SEPO 303 may receive the seventh instruction B3. The common platform token SEPO 303 may include self-executing programming that automatically executes the seventh instruction B3 according to the parameters of the seventh instruction B3. Thus, the common platform token SEPO 303 may burn the tokens in response to the seventh instruction B3, thus completing the transfer of assets.

In some embodiments, the network token operations may include burning the token from the receiving wallet associated with the receiving wallet address. To do so, the common platform token SEPO may submit a transaction to the distributed crypto-ledger 115. The transaction may indicate the burning of the token from the receiving wallet, thus removing the token from the distributed crypto-ledger 115.

In some embodiments, each SEPO may be a SEPO operating the distributed crypto-ledger 115. Accordingly, the self-executing operations of each SEPO may include writing transactions to the distributed crypto-ledger 115 to record each operation and each instruction, including the function caller, the function identifier, the parameters, the returns and any other data to the distributed crypto-ledger 115. Thus, the instructions to execute the transfer may be securely and immutably recorded to the distributed crypto-ledger 115 alongside but independent of the tokens used in the transfer.

Figure 4A:
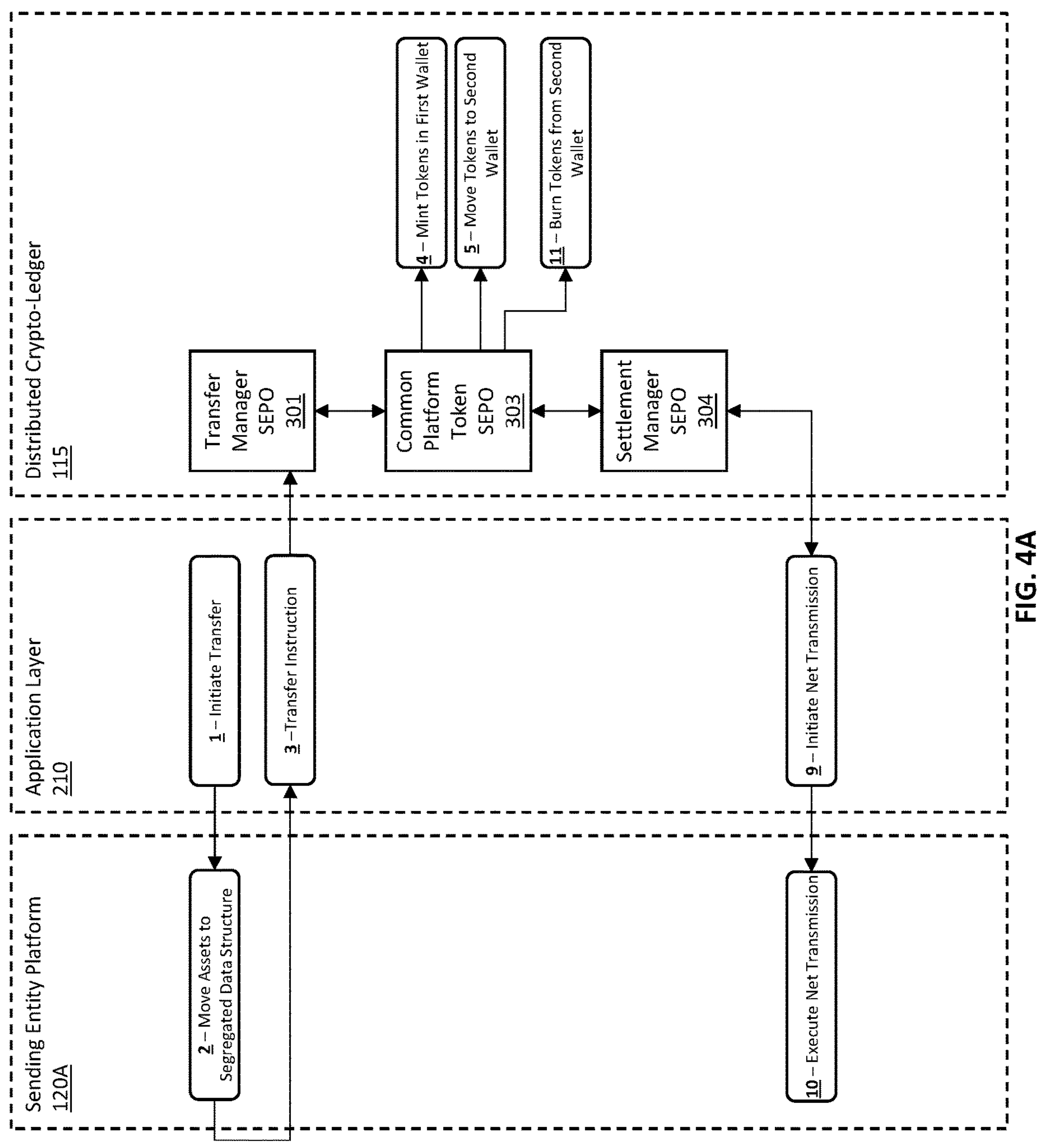
FIG. 4A is a diagram illustrating a sender-side instruction flow for orchestrating the SEPOs on the distributed crypto-ledger 115 to perform an asset movement in accordance with one or more aspects of the embodiments of the present disclosure.

FIG. 4A is a diagram illustrating a sender-side instruction flow for orchestrating the SEPOs on the distributed crypto-ledger 115 to perform an asset movement in accordance with one or more aspects of the embodiments of the present disclosure.

Figure 4B:
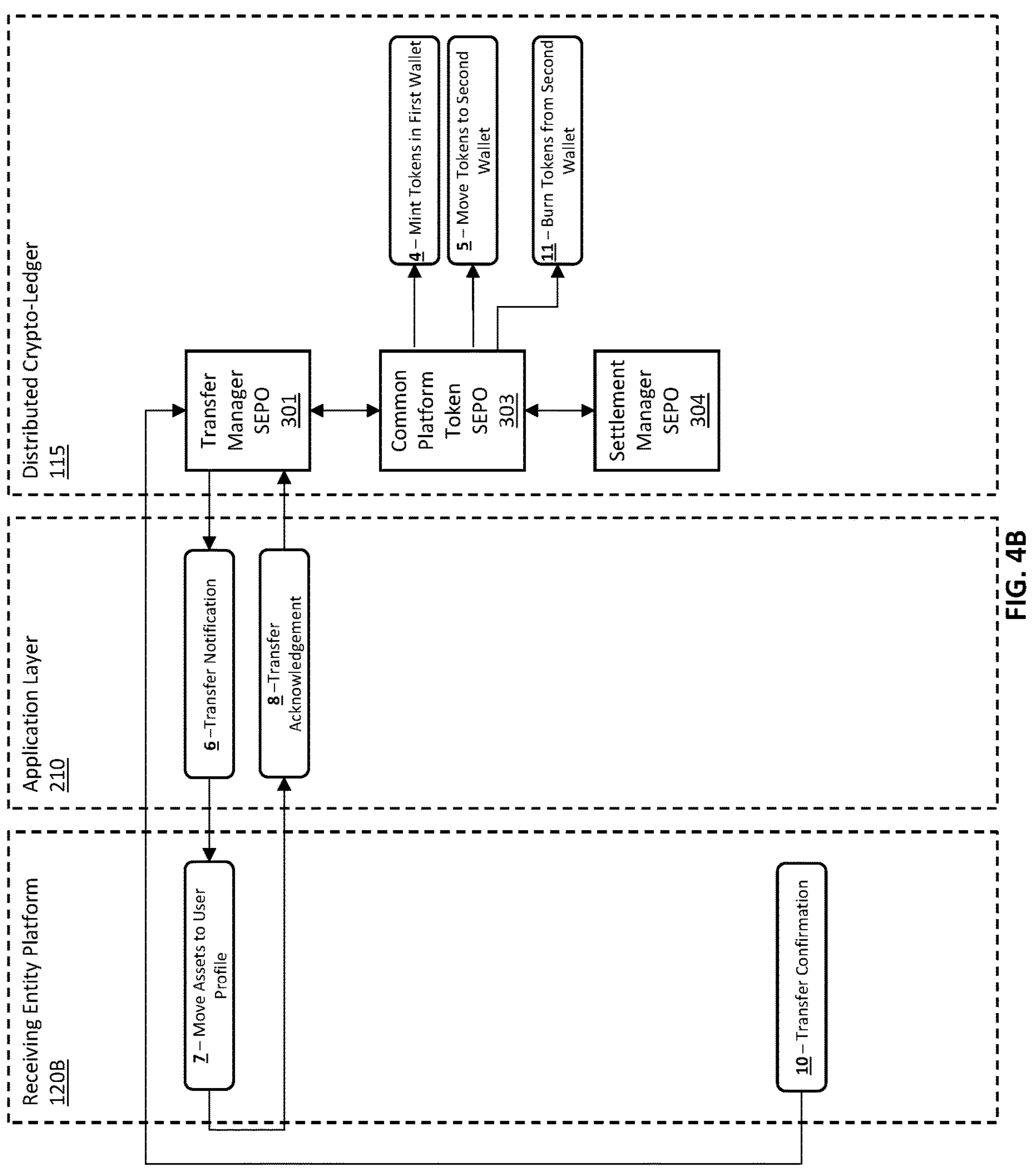
FIG. 4B is a diagram illustrating a receiver-side instruction flow for orchestrating the SEPOs on the distributed crypto-ledger 115 to perform the asset movement of FIG. 4A in accordance with one or more aspects of the embodiments of the present disclosure.

FIG. 4B is a diagram illustrating a receiver-side instruction flow for orchestrating the SEPOs on the distributed crypto-ledger 115 to perform the asset movement of FIG. 4A in accordance with one or more aspects of the embodiments of the present disclosure.

In some embodiments, the instruction architecture of the common platform 110 enables communication between the sending entity platform 120A, the receiving entity platform 120B and an application layer 210 for implementing the distributed crypto-ledger 115 to facilitate transfers under the control of the common platform 110. In some embodiments, the application layer 210 may include, e.g., an application of a user computing device, a cloud service provided by one or more servers, or any other suitable common platform 110 service and/or application or any combination thereof.

In some embodiments, where the first entity platform 120A instructs to transfer the quantity of the asset from a user profile on the sending entity platform 120A to a user profile on the receiving entity platform 120B, the application layer 210 may be used to initiate the transfer at step 1. Initiating the transfer may include a user selection and/or input of the receiving user, the asset, the quantity of the asset, a date, a time, or any other suitable transfer details or any combination thereof. The user selection and/or input may define parameters for the transfer including, e.g., the sending address based on the user, the receiving address based on the receiving user, the asset, the quantity of the asset, the date, the time, etc. The application layer 210 may provide the transfer to the sending entity platform 120A.

In some embodiments, at step 2, the sending entity platform 120A may receive the transfer and move the quantity of the asset from the user's profile into a segregated data structure. The segregated data structure includes a data storage schema that facilitates moving the quantity of the asset across the distributed platform network 100. Accordingly, the segregated data structure may include a schema for storing the quantity of the asset, preparing the quantity of the asset for transfer, and/or communicating with the application layer 210, common platform 110 and/or the net transmission execution system 200 to execute the transfer of the quantity of the asset.

In some embodiments, at step 3, upon moving the assets into the segregated data structure, the application layer 210 may generate a transfer instruction. The transfer instruction may include, e.g., the first instruction of FIG. 3 described above, including the parameters and return thereof. In some embodiments, in response to the transfer instruction, the transfer manager SEPO 301 may automatically perform transfer management operations, including instructing the common platform token SEPO 303 to perform a mint/transfer operation on the distributed crypto-ledger 115.

In some embodiments, at step 4, the common platform token SEPO 303 may use the parameters of the transfer instruction to mint tokens in a first wallet associated with the sending address. In some embodiments, the token type may be specified in a transfer message of the transfer instruction, or may be determined based on the asset. In some embodiments, the first wallet may be associated with the sending user, but advantageously, may be for the sending entity platform 120A to account for transfers between platforms on the distributed platform network 100.

In some embodiments, at step 5, the common platform token SEPO 303 may transfer the token to a second wallet associated with the receiving user, the receiving entity platform 120B, or a combination thereof. Thus, the token representing the quantity of the asset may be reassigned to the receiving entity.

In some embodiments, at step 6, based on the transfer of the tokens to the second wallet, the transfer manager SEPO 301 may return to the application layer 210 the status of the transfer including the completion of the transfer of the token. As a result, the quantity of the asset may be reassigned across the distributed platform network 100 to the receiving entity, even through the asset itself remains at the sending entity platform 120A, e.g., in the segregated data structure. the application layer 210 may provide the transfer notification to the receiving entity platform 120B to confirm to the receiving entity platform 120B of the reassignment of the quantity of the asset.

In some embodiments, at step 7, the receiving entity platform 120B leverage the immutable and secure nature of the distributed crypto-ledger 115 to provide a corresponding quantity of a corresponding asset to the quantity of the asset into a user profile of the receiving user. For example, the receiving entity platform 120B may having a segregated data structure with a balance of assets which the receiving entity platform 120B may move upon verification of the transfer of the token. Thus, by leveraging the distributed crypto-ledger 115 and asynchronous instruction architecture, the receiving user may receive the quantity of the assets in real-time before the receiving entity platform 120B receives the quantity of the assets.

In some embodiments, at step 8, the application layer 210 may return a transfer acknowledgement to the transfer manager SEPO 301 acknowledging and confirming the receipt of the transfer notification by the receiving entity platform 120B.

In some embodiments, at step 9, a later net transmission may be initiated and executed to settle the transfer of the token, e.g., using the net transmission engine 113 and the net transmission execution system 200 as described above. In some embodiments, to reduce network resources, the net transmission engine 113 may batch the settlement of the transfer with other transfers for a net transmission of assets that settles the batch of transfers. The application layer 210 may provide a settlement instruction to the settlement manager SEPO 304, which may cause the settlement manager SEPO 304 to return the transfer among other transfers in the batch that are awaiting settlement.

In some embodiments, at step 10, the sending entity platform 120A and the receiving entity platform 120B may participate in executing the net transmission, e.g., via the net transmission execution system 200. Upon execution, the transfer manager SEPO 301 may receive a transfer confirmation indicating the executed transfer as a result of the net transmission. For example, the receiving entity platform 120B may communicate an instruction to the transfer manager SEPO 301 to confirm the transfer. In response, the transfer manager SEPO 301 may instruct the common platform token SEPO 303 to complete the transfer of the token on the distributed crypto-ledger.

In some embodiments, at step 11, the common platform token SEPO 303 may complete the transfer of the token by burning the token from the second wallet, e.g., as described above. Thus, the tokenization of the quantity of the asset may be removed, thus removing the pending settlement associated with the token and finalizing the transfer.

In some embodiments, each SEPO may be a SEPO operating the distributed crypto-ledger 115. Accordingly, the self-executing operations of each SEPO may include writing transactions to the distributed crypto-ledger 115 to record each operation and each instruction, including the function caller, the function identifier, the parameters, the returns and any other data to the distributed crypto-ledger 115. Thus, the instructions to execute the transfer may be securely and immutably recorded to the distributed crypto-ledger 115 alongside but independent of the tokens used in the transfer.

Figure 5:
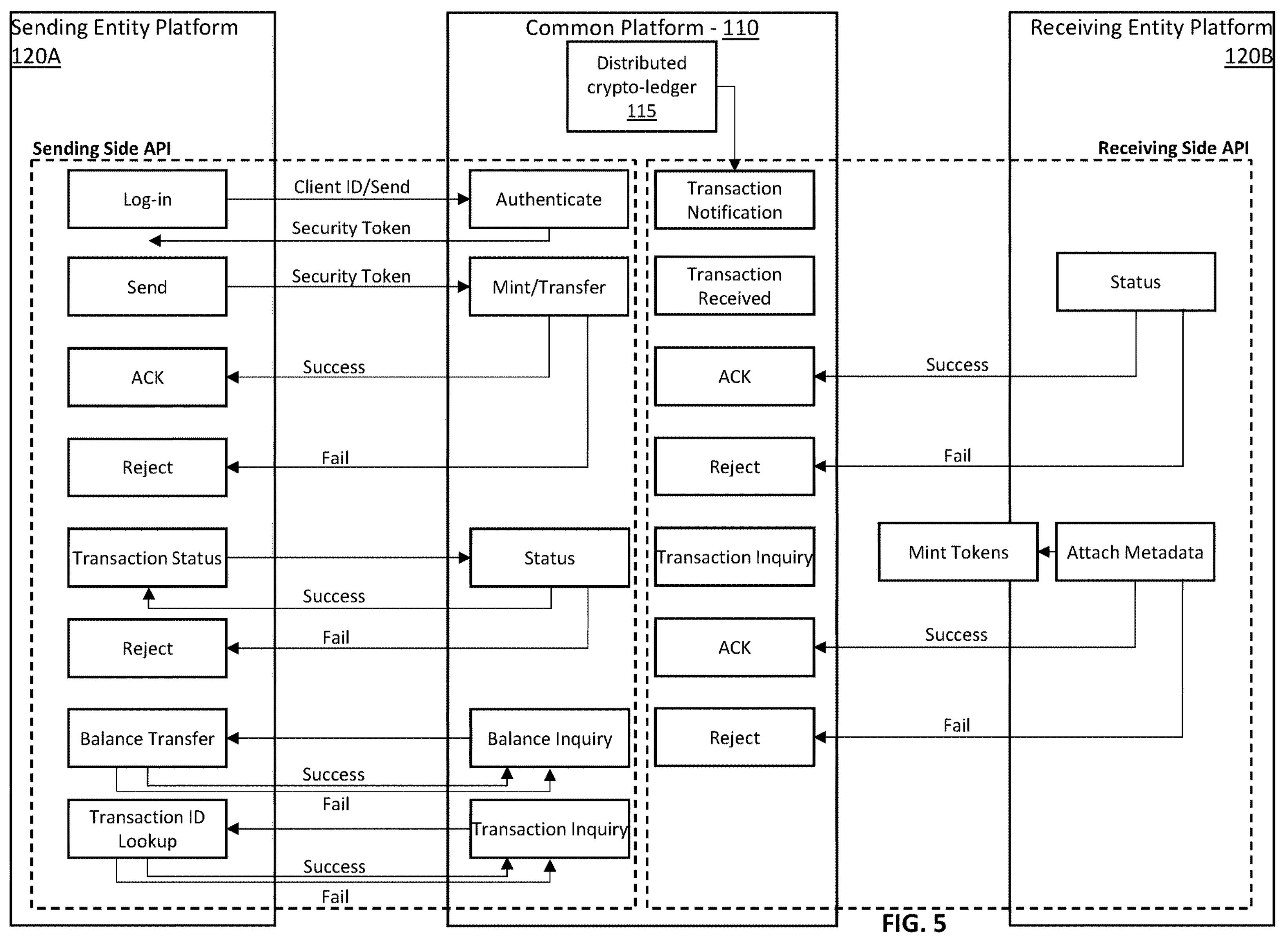
FIG. 5 is a diagram illustrating an application programming interface (API) architecture for communicating instructions for orchestrating the SEPOs on the distributed crypto-ledger 115 to perform an asset movement in accordance with one or more embodiments of the present disclosure.

FIG. 5 is a diagram illustrating an application programming interface (API) architecture for communicating instructions for orchestrating the SEPOs on the distributed crypto-ledger 115 to perform an asset movement in accordance with one or more embodiments of the present disclosure.

In some embodiments, an API may be implemented to enable the sending entity platform 120A and the receiving entity platform 120B to issue requests and instructions to the common platform 110. In some embodiments, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, a log-in API request form the sending side API may provide a client ID associated with a user and a send request (e.g., transfer request). An authenticate function of the common platform 110 may receiving the transfer request and return a security token enabling the user to access the common platform 110 to instruct a transfer.

In some embodiments, using the security token, the sending entity platform 120A may send the transfer request, validated by the security token. A mint/transfer function, e.g., orchestrated by the transfer manager SEPO 301 and the common platform token SEPO 303, may receive and execute the transfer request on the distributed crypto-ledger 115 by minting a token in a first wallet and transferring the token to a second wallet. In some embodiments, the mint/transfer function may return a success or fail message, which may in turn trigger an acknowledgement or return, respectively, at the sending entity platform 120A.

In some embodiments, the sending entity platform 120A may query the status of the transfer request using a transaction status call. A status function of the common platform 110, e.g., performed by the transfer manager SEPO 301, may determine a status of the transfer request and return a success or fail message. In some embodiments, the sending entity platform 120A may reject in response to the fail message.

In some embodiments, the common platform 110 may perform a balance inquiry call to the sending entity platform 120A to ascertain a balance of a profile of the sending entity platform 120A. In some embodiments, the sending entity platform 120A may have a balance transfer function that returns a response to the balance inquiry including a success message including the balance for the profile associated with the balance inquiry. Where the profile does not exist or another error occurs, the balance transfer function may return a fail response.

In some embodiments, the common platform 110 may perform a transaction inquiry call to the sending entity platform 120A to ascertain a status of a transaction associated with a particular transaction ID. In some embodiments, the sending entity platform 120A may have a transaction ID lookup function that returns a response to the transaction inquiry including a success message including the status of the transaction associated with the transaction ID. Where the transaction ID does not correspond to an existing transaction, or another error occurs, the transaction ID lookup function may return a fail response.

In some embodiments, upon the transfer request causing the mint/transfer function, the distributed crypto-ledger 115 may produce a transaction notification on the receiving side API to notify the receiving entity platform 120B of the transfer request. In some embodiments, the common platform 110 may also include a call to mark the transaction as received.

In some embodiments, the receiving entity platform 120B may issue a status call to report a status of the transfer, e.g., using the transaction ID to mark the transfer request as complete or incomplete. In some embodiments, where the status is complete, the status call may report a success, which may be acknowledged by the common platform. Where the status is incomplete or unknown, the status call may include a fail, which may be rejected by the common platform 110.

In some embodiments, the common platform 110 may perform a transaction inquiry call to the receiving entity platform 120B to ascertain a status of a transaction associated with a particular transaction ID. In some embodiments, the receiving entity platform 120B may have a transaction ID lookup function that returns a response to the transaction inquiry including a success message including the status of the transaction associated with the transaction ID. Where the transaction ID does not correspond to an existing transaction, or another error occurs, the transaction ID lookup function may return a fail response.

In some embodiments, where the receiving entity platform 120B employs a local entity-specific distributed crypto-ledger for the recordation and movement of assets within the receiving entity platform 120B, the receiving entity platform 120B may attach metadata to a token and mint the token on the receiving entity platform 120B. The receiving entity platform 120B may then issue a call reporting the minting and/or the metadata to the common platform 110. Where the minting is successful, the receiving entity platform 120B may provide a success message, which the common platform 110 may receive and acknowledge. Where the minting has not occurred or failed, the receiving entity platform 120B may provide a fail message, which the common platform 110 may perform a reject.

Figure 6:
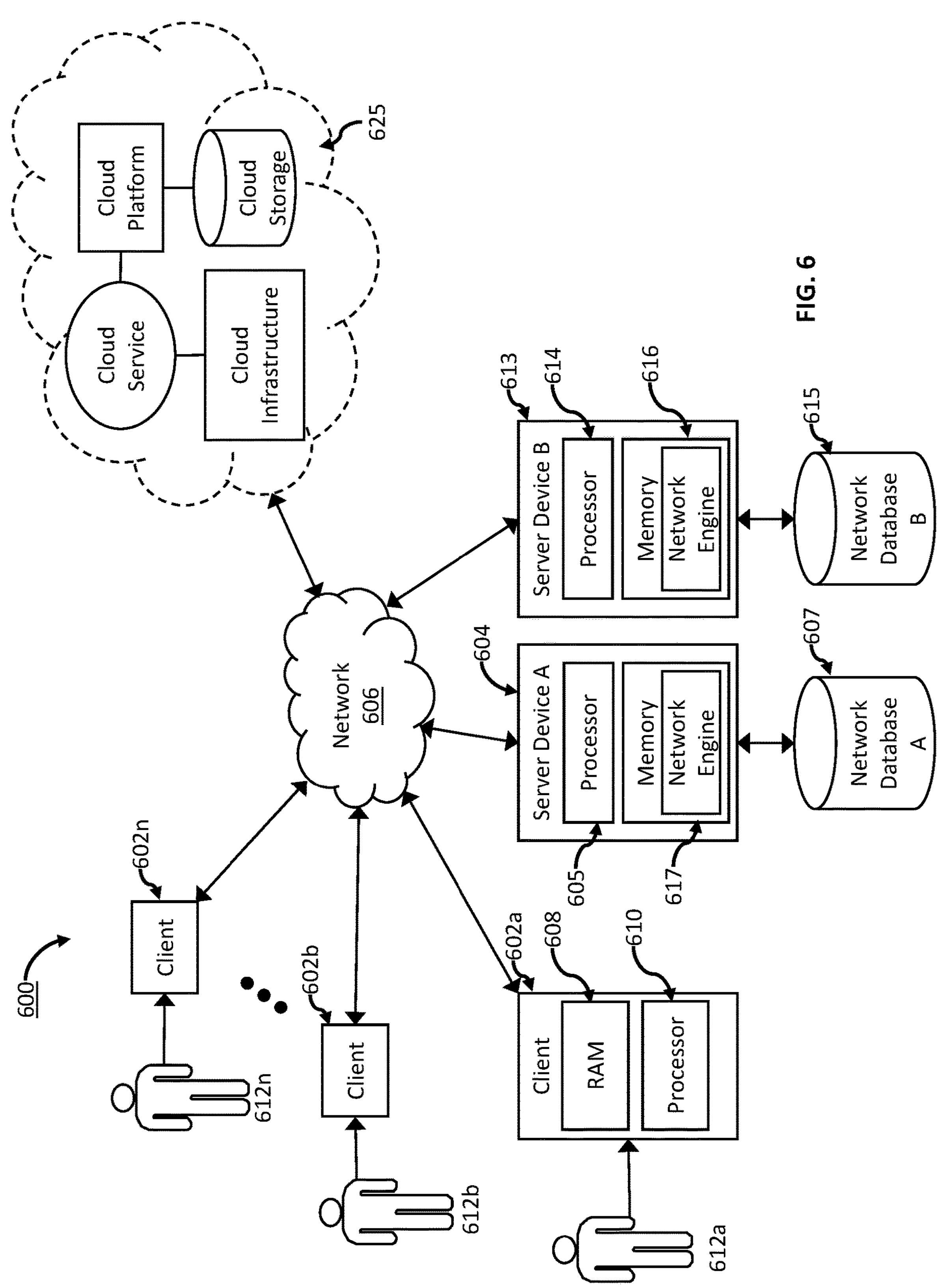
FIG. 6 depicts a block diagram of another exemplary computer-based system and platform for distributed segregated data structures for network-wide net transmissions of assets to satisfy aggregates of tokenized asset transfers in accordance with one or more embodiments of the present disclosure.

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 602*a*, member computing device 602*b* through member computing device 602*n* shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602*a* through 602*n* may also comprise a number of external or internal devices such as a mouse, a CD-ROM, DVD, a physical or virtual keyboard, a display, or other input or output devices. In some embodiments, examples of member computing devices 602*a* through 602*n* (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602*a* through 602*n* may be specifically programmed with one or more application programs in accordance with one or more principles/methodologies detailed herein. In some embodiments, member computing devices 602*a* through 602*n* may operate on any operating system capable of supporting a browser or browser-enabled application, such as Microsoft™, Windows™ and/or Linux. In some embodiments, member computing devices 602*a* through 602*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602*a* through 602*n*, user 612*a*, user 612*b* through user 612*n*, may communicate over the exemplary network 606 with each other and/or with other systems and/or devices coupled to the network 606. As shown in FIG. 4, exemplary server devices 604 and 613 may include processor 605 and processor 614, respectively, as well as memory 617 and memory 616, respectively. In some embodiments, the server devices 604 and 613 may be also coupled to the network 606. In some embodiments, one or more member computing devices 602*a* through 602*n* may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
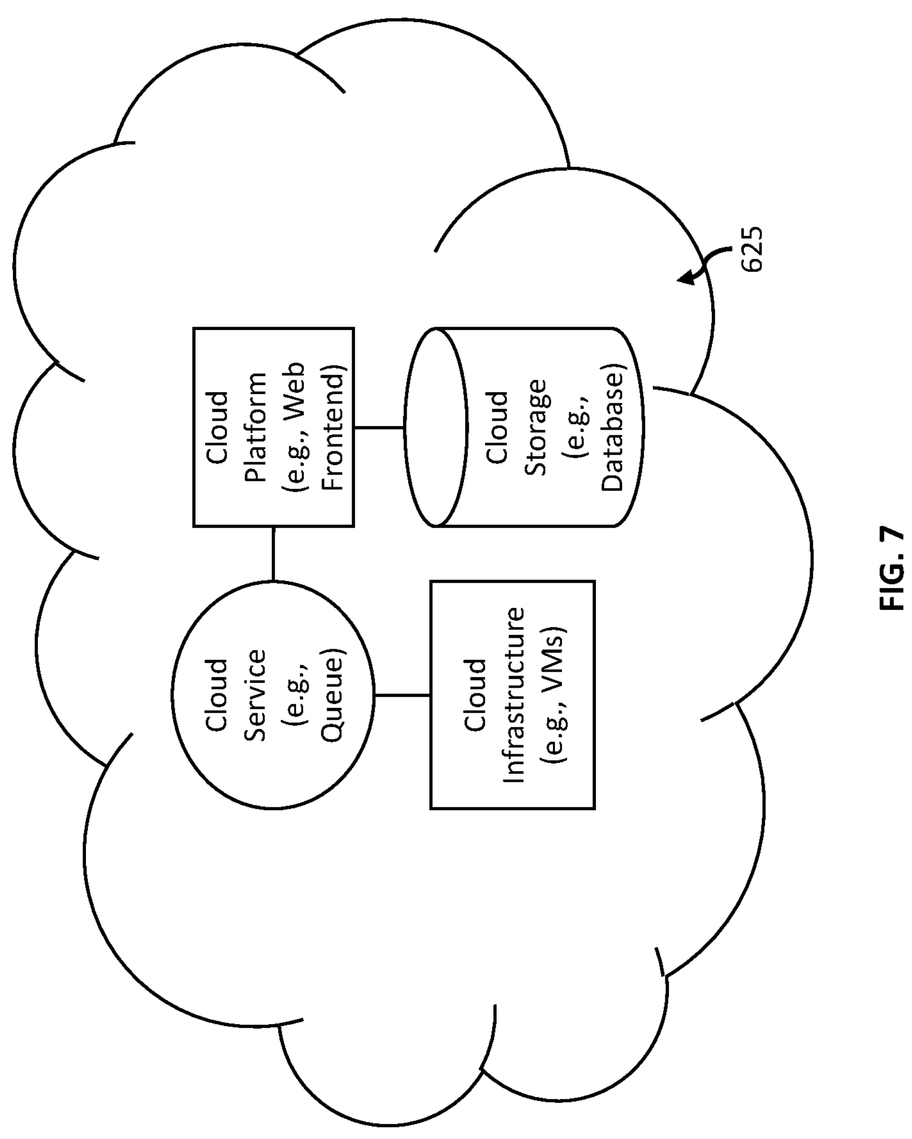
FIG. 7 depicts illustrative schematics of an exemplary implementation of the cloud computing/architecture(s) in which embodiments of a system for distributed segregated data structures for network-wide net transmissions of assets to satisfy aggregates of tokenized asset transfers may be specifically configured to operate in accordance with some embodiments of the present disclosure.
Figure 8:
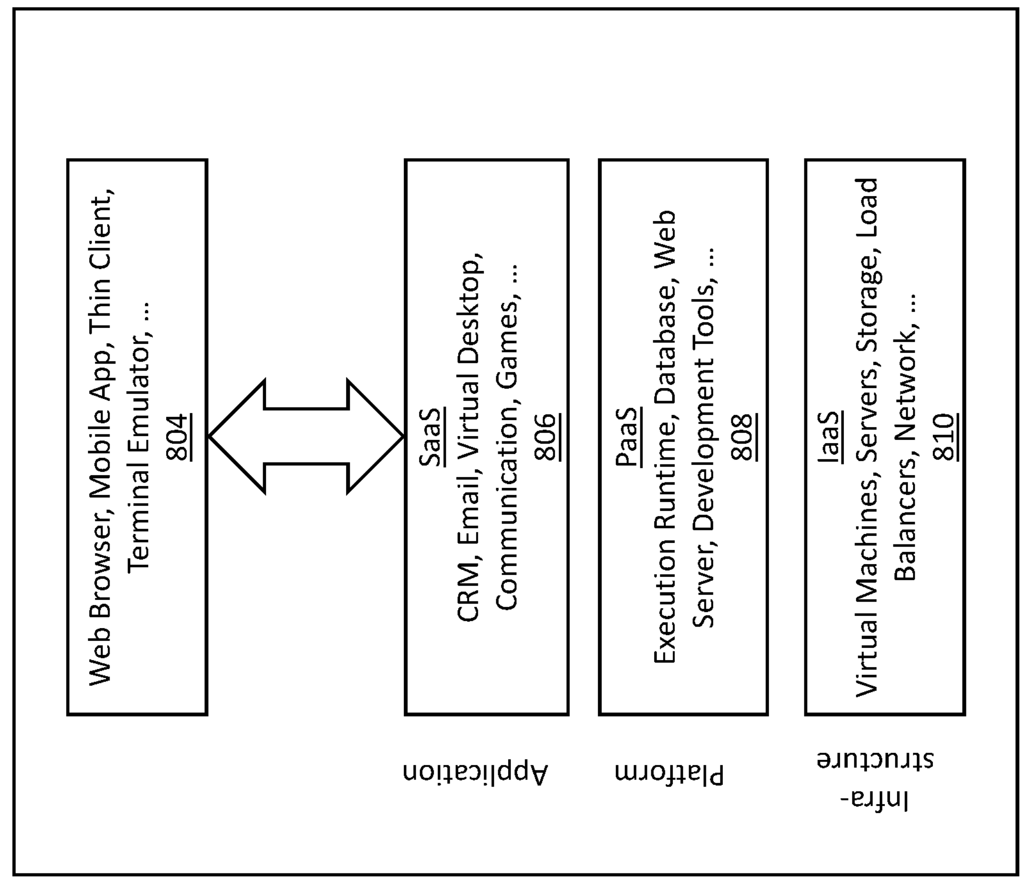
FIG. 8 depicts illustrative schematics of another exemplary implementation of the cloud computing/architecture(s) in which embodiments of a system for distributed segregated data structures for network-wide net transmissions of assets to satisfy aggregates of tokenized asset transfers may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator or other endpoint 804. FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RCS, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A method comprising:
   receiving, by at least one processor of a distributed common entity platform, a transfer instruction associated with a transfer of a quantity of an asset from a sending entity platform to a receiving entity platform;

wherein the transfer instruction comprises transfer parameters comprising:

a sending address associated with a sender of the quantity of the asset on the sending entity platform, a receiving address associated with a receiver of the quantity of the asset on the receiving entity platform, an asset identifier identifying the asset, a quantity value representing the quantity of the asset, and a first function identifier identifying a first function to be performed;

executing, by the at least one processor, a manager self-executing programming object (SEPO) in response to the first function identifier to execute transfer management operations on a distributed crypto-ledger, managed by the distributed common entity platform;

wherein the transfer management operations comprise:

generating a second instruction comprising second instruction parameters;

wherein the second instruction parameters comprise:

a sending address, a receiving address, and a second function identifier identifying a second function to be performed;

executing, by the at least one processor, an address SEPO in response to second function identifier of the second instruction to execute address verification operations on the distributed crypto-ledger;

wherein the address verification operations comprise:

accessing an address log associated with the distributed crypto-ledger, verifying the sending address and the receiving address based at least in part on the address log, and returning address data associated with the distributed crypto-ledger, the address data comprising:

a sending wallet address associated with the sending address and a receiving wallet address associated with the receiving address;

wherein the transfer manager SEPO is further configured to execute transfer management operations on the distributed crypto-ledger, comprising:

generating a third instruction to a network token SEPO in response to the address data;

wherein the third instruction comprises:

a third function identifier identifying a third function to be performed, the sending wallet address, the receiving wallet address, the asset identifier, and the quantity value;

executing, by the at least one processor, the network token SEPO in response to the third function identifier of the third instruction to execute network token operations on the distributed crypto-ledger;

wherein the network token operations comprise:

minting at least one token in a sending wallet associated with the sending wallet address, wherein the at least one token comprises a tokenized version of the quantity of the asset based at least in part on the asset identifier and the quantity value, and transferring the at least one token from the sending wallet to a receiving wallet associated with the receiving wallet address;

wherein the transfer manager SEPO is further configured to execute transfer management operations on the distributed crypto-ledger, comprising:

generating a fourth instruction to a settlement manager SEPO;

wherein the fourth instruction comprises:

a fourth function identifier identifying a fourth function to be performed, the sending wallet address, the receiving wallet address, the asset identifier, and the quantity value;

executing, by the at least one processor, the settlement manager SEPO in response to the fourth function identifier of the fourth instruction to:

execute settlement operations on the distributed crypto-ledger;

wherein the settlement operations comprise:

logging a pending settlement representing an awaited transfer of the quantity of the asset matching the at least one token transferred from the sending wallet to the receiving wallet, receiving at least one settlement instruction from at least one settlement system, wherein the at least one settlement instruction instructs the settlement manager SEPO to return the pending settlement;

transmitting the pending settlement to the at least one settlement system to initiate at least one settlement of the at least one token;

wherein the transfer manager SEPO is further configured to execute transfer management operations on the distributed crypto-ledger, comprising:

receiving a transfer confirmation from the receiving entity platform, wherein the transfer confirmation confirms the transfer of the quantity of the asset from the sending address to the receiving address;

generating a fifth instruction to the network token SEPO based on the transfer confirmation;

wherein the fifth instruction comprises:

a fifth function identifier identifying a fifth function to be performed, the sending wallet address, the receiving wallet address, the asset identifier, and the quantity value; and executing, by the at least one processor, the network token SEPO in response to the fifth function identifier of the fifth instruction to further execute the network token operations on the distributed crypto-ledger;

wherein the network token operations further comprise:

burning the at least one token from the receiving wallet address in response to the transfer confirmation.

2. A system comprising:

at least one processor of a distributed common entity platform, wherein the at least one processor is configured to perform steps to:

receive a transfer instruction associated with a transfer of a quantity of an asset from a sending entity platform to a receiving entity platform;

wherein the transfer instruction comprises transfer parameters comprising:

a sending address associated with a sender of the quantity of the asset on the sending entity platform, a receiving address associated with a receiver of the quantity of the asset on the receiving entity platform, an asset identifier identifying the asset, a quantity value representing the quantity of the asset, and a first function identifier identifying a first function to be performed;

execute a manager self-executing programming object (SEPO) in response to the first function identifier to execute transfer management operations on a distributed crypto-ledger, managed by the distributed common entity platform;

wherein the transfer management operations comprise:

generating a second instruction comprising second instruction parameters;

wherein the second instruction parameters comprise:

a sending address, a receiving address, and a second function identifier identifying a second function to be performed;

execute an address SEPO in response to second function identifier of the second instruction to execute address verification operations on the distributed crypto-ledger;

wherein the address verification operations comprise:

accessing an address log associated with the distributed crypto-ledger, verifying the sending address and the receiving address based at least in part on the address log, and returning address data associated with the distributed crypto-ledger, the address data comprising:

a sending wallet address associated with the sending address and a receiving wallet address associated with the receiving address;

wherein the transfer manager SEPO is further configured to execute transfer management operations on the distributed crypto-ledger, comprising:

generating a third instruction to a network token SEPO in response to the address data;

wherein the third instruction comprises:

a third function identifier identifying a third function to be performed, the sending wallet address, the receiving wallet address, the asset identifier, and the quantity value;

execute the network token SEPO in response to the third function identifier of the third instruction to execute network token operations on the distributed crypto-ledger;

wherein the network token operations comprise:

minting at least one token in a sending wallet associated with the sending wallet address, wherein the at least one token comprises a tokenized version of the quantity of the asset based at least in part on the asset identifier and the quantity value, and transferring the at least one token from the sending wallet to a receiving wallet associated with the receiving wallet address;

wherein the transfer manager SEPO is further configured to execute transfer management operations on the distributed crypto-ledger, comprising:

generating a fourth instruction to a settlement manager SEPO;

wherein the fourth instruction comprises:

a fourth function identifier identifying a fourth function to be performed, the sending wallet address, the receiving wallet address, the asset identifier, and the quantity value;

execute the settlement manager SEPO in response to the fourth function identifier of the fourth instruction to:

execute settlement operations on the distributed crypto-ledger;

wherein the settlement operations comprise:

logging a pending settlement representing an awaited transfer of the quantity of the asset matching the at least one token transferred from the sending wallet to the receiving wallet, receiving at least one settlement instruction from at least one settlement system, wherein the at least one settlement instruction instructs the settlement manager SEPO to return the pending settlement;

transmitting the pending settlement to the at least one settlement system to initiate at least one settlement of the at least one token;

wherein the transfer manager SEPO is further configured to execute transfer management operations on the distributed crypto-ledger, comprising:

receiving a transfer confirmation from the receiving entity platform, wherein the transfer confirmation confirms the transfer of the quantity of the asset from the sending address to the receiving address;

generating a fifth instruction to the network token SEPO based on the transfer confirmation;

wherein the fifth instruction comprises:

a fifth function identifier identifying a fifth function to be performed, the sending wallet address, the receiving wallet address, the asset identifier, and the quantity value; and execute the network token SEPO in response to the fifth function identifier of the fifth instruction to further execute the network token operations on the distributed crypto-ledger;

wherein the network token operations further comprise:

burning the at least one token from the receiving wallet address in response to the transfer confirmation.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A system comprising:

at least one processor of a distributed common entity platform, wherein the at least one processor is configured to perform steps to:

receive an electronic transfer instruction associated with an electronic transfer of a quantity of an asset across a first network from a sending entity platform to a receiving entity platform;

wherein the sending entity platform comprises a first plurality of accounts associated with a first plurality of users;

wherein the receiving entity platform comprises a second plurality of accounts associated with a second plurality of users;

wherein the electronic transfer instruction comprises electronic transfer parameters comprising:

a sending network address on the first network associated with a sender of the quantity of the asset on the sending entity platform, the sender comprising at least one of the first plurality of users, a receiving network address on the first network associated with a receiver of the quantity of the asset on the receiving entity platform, the receiver comprising at least one of the second plurality of users, an asset identifier identifying the asset, a quantity value representing the quantity of the asset, and a first function identifier identifying a first function to be performed;

execute a transfer manager self-executing programming object (SEPO) in response to the first function identifier to execute transfer management operations on a distributed crypto-ledger of a second network, managed by the distributed common entity platform;

wherein the transfer management operations comprise:

generating a second electronic instruction comprising second electronic instruction parameters;

wherein the second electronic instruction parameters comprise:

the sending network address, the receiving network address, and a second function identifier identifying a second function to be performed;

execute an address SEPO in response to the second function identifier of the second electronic instruction to execute network address verification operations on the distributed crypto-ledger;

wherein the network address verification operations comprise:

accessing an address log associated with the distributed crypto-ledger on the second network, verifying the sending network address and the receiving network address based at least in part on the address log, and returning second network address data associated with the distributed crypto-ledger, the address data comprising:

a sending wallet network address associated with the sending address and a receiving wallet network address associated with the receiving address;

wherein the transfer manager SEPO is further configured to execute transfer management operations on the second network via the distributed crypto-ledger, comprising:

generating a third electronic instruction to a network token SEPO in response to the address data;

wherein the third instruction comprises:

a third function identifier identifying a third function to be performed;

the sending wallet network address;

the receiving wallet network address;

the asset identifier, and the quantity value;

execute the network token SEPO in response to the third function identifier of the third electronic instruction to execute network token operations on the distributed crypto-ledger; wherein the network token operations comprise:

automatically minting at least one token in a sending wallet associated with the sending wallet network address, wherein the at least one token comprises a tokenized version of the quantity of the asset based at least in part on the asset identifier and the quantity value, and performing at least one first distributed crypto-ledger transfer of the at least one token from the sending wallet to a receiving wallet associated with the receiving wallet network address;

aggregate the at least one first distributed crypto-ledger transfer with at least one additional distributed crypto-ledger transfer between sending entity platform and the receiving entity platform across the second network for at least one first period of time; and automatically trigger, upon the at least one first period of time elapsing and detection of the at least one token being transferred across the second network via the distributed crypto-ledger to the receiving wallet network address, to asynchronously perform an electronic transfer of a net electronic transfer across the first network, the net electronic transfer comprising the quantity of the asset from the sending entity platform to the receiving entity platform across the first network aggregated with at least one other quantity of at least one asset associated with the at least one additional distributed crypto-ledger transfer to complete the first function independently of the distributed crypto-ledger.

2. The system of claim 1, wherein the transfer manager SEPO is further configured to execute transfer management operations on the distributed crypto-ledger, comprising generating a fourth instruction to a settlement manager SEPO;

wherein the fourth instruction comprises:

a fourth function identifier identifying a fourth function to be performed, the sending wallet address, the receiving wallet address, the asset identifier, and the quantity value.

3. The system of claim 2 wherein the transfer manager SEPO is further configured to execute the settlement manager SEPO in response to the fourth function identifier of the fourth instruction to execute settlement operations on the distributed crypto-ledger;

wherein the settlement operations comprise:

logging a pending settlement representing an awaited transfer of the quantity of the asset matching the at least one token transferred from the sending wallet to the receiving wallet, receiving at least one settlement instruction from at least one settlement system, wherein the at least one settlement instruction instructs the settlement manager SEPO to return the pending settlement; and transmitting the pending settlement to the at least one settlement system to initiate at least one settlement of the at least one token.

4. The system of claim 1 wherein the transfer manager SEPO is further configured to execute transfer management operations on the distributed crypto-ledger, comprising:

receiving a transfer confirmation from the receiving entity platform, wherein the transfer confirmation confirms the transfer of the quantity of the asset from the sending address to the receiving address; and generating a fifth instruction to the network token SEPO based on the transfer confirmation;

wherein the fifth instruction comprises:

a fifth function identifier identifying a fifth function to be performed, the sending wallet address, the receiving wallet address, the asset identifier, and the quantity value.

5. The system of claim 4, further configured to execute the network token SEPO in response to the fifth function identifier of the fifth instruction to further execute the network token operations on the distributed crypto-ledger;

wherein the network token operations further comprise:

burning the at least one token from the receiving wallet address in response to the transfer confirmation.

6. A method comprising:

receiving, by at least one processor of a distributed common entity platform, an electronic transfer instruction associated with an electronic transfer of a quantity of an asset across a first network from a sending entity platform to a receiving entity platform;

wherein the sending entity platform comprises a first plurality of accounts associated with a first plurality of users;

wherein the receiving entity platform comprises a second plurality of accounts associated with a second plurality of users;

wherein the electronic transfer instruction comprises electronic transfer parameters comprising:

a sending network address on the first network associated with a sender of the quantity of the asset on the sending entity platform, the sender comprising at least one of the first plurality of users;

a receiving network address on the first network associated with a receiver of the quantity of the asset on the receiving entity platform, the receiver comprising at least one of the second plurality of users;

an asset identifier identifying the asset;

a quantity value representing the quantity of the asset, and a first function identifier identifying a first function to be performed;

executing, by the at least one processor, a transfer manager self-executing programming object (SEPO) in response to the first function identifier to execute transfer management operations on a distributed crypto-ledger of a second network, managed by the distributed common entity platform, wherein the transfer management operations comprise:

generating a second electronic instruction comprising second electronic instruction parameters, wherein the second electronic instruction parameters comprise:

the sending network address, the receiving network address, and a second function identifier identifying a second function to be performed;

executing, by the at least one processor, an address SEPO in response to the second function identifier of the second electronic instruction to execute network address verification operations on the distributed crypto-ledger, wherein the address verification operations comprise:

accessing an address log associated with the distributed crypto-ledger on the second network, verifying the sending network address and the receiving network address based at least in part on the address log, and returning second network address data associated with the distributed crypto-ledger, the address data comprising:

a sending wallet network address associated with the sending address and a receiving wallet network address associated with the receiving address;

wherein the transfer manager SEPO is further configured to execute transfer management operations on the second network via the distributed crypto-ledger, comprising:

generating a third electronic instruction to a network token SEPO in response to the address data, wherein the third instruction comprises:

a third function identifier identifying a third function to be performed, the sending wallet network address, the receiving wallet network address, the asset identifier, and the quantity value;

executing, by the at least one processor, the network token SEPO in response to the third function identifier of the third electronic instruction to execute network token operations on the distributed crypto-ledger; wherein the network token operations comprise:

automatically minting at least one token in a sending wallet associated with the sending wallet network address, wherein the at least one token comprises a tokenized version of the quantity of the asset based at least in part on the asset identifier and the quantity value, and performing at least one first distributed crypto-ledger transfer of the at least one token from the sending wallet to a receiving wallet associated with the receiving wallet network address;

aggregating, by the at least one processor, the at least one first distributed crypto-ledger transfer with at least one additional distributed crypto-ledger transfer between sending entity platform and the receiving entity platform across the second network for at least one first period of time; and automatically triggering, by the at least one processor, upon the at least one first period of time elapsing and detection of the at least one token being transferred across the second network via the distributed crypto-ledger to the receiving wallet network address, to asynchronously perform an electronic transfer of a net electronic transfer across the first network, the net electronic transfer comprising the quantity of the asset from the sending entity platform to the receiving entity platform across the first network aggregated with at least one other quantity of at least one asset associated with the at least one additional distributed crypto-ledger transfer to complete the first function independently of the distributed crypto-ledger.

7. The method of claim 6 wherein the transfer manager SEPO is further configured to execute transfer management operations on the distributed crypto-ledger, comprising:

generating a fourth instruction to a settlement manager SEPO;

wherein the fourth instruction comprises:

a fourth function identifier identifying a fourth function to be performed, the sending wallet address, the receiving wallet address, the asset identifier, and the quantity value.

8. The method of claim 7 comprising executing, by the at least one processor, the settlement manager SEPO in response to the fourth function identifier of the fourth instruction to:

execute settlement operations on the distributed crypto-ledger;

wherein the settlement operations comprise:

logging a pending settlement representing an awaited transfer of the quantity of the asset matching the at least one token transferred from the sending wallet to the receiving wallet, receiving at least one settlement instruction from at least one settlement system, wherein the at least one settlement instruction instructs the settlement manager SEPO to return the pending settlement; and transmitting the pending settlement to the at least one settlement system to initiate at least one settlement of the at least one token.

9. The method of claim 8, wherein the transfer manager SEPO is further configured to execute transfer management operations on the distributed crypto-ledger, comprising:

receiving a transfer confirmation from the receiving entity platform, wherein the transfer confirmation confirms the transfer of the quantity of the asset from the sending address to the receiving address;

generating a fifth instruction to the network token SEPO based on the transfer confirmation;

wherein the fifth instruction comprises:

a fifth function identifier identifying a fifth function to be performed, the sending wallet address, the receiving wallet address, the asset identifier, and the quantity value.

10. The method of claim 9, further comprising executing, by the at least one processor, the network token SEPO in response to the fifth function identifier of the fifth instruction to further execute the network token operations on the distributed crypto-ledger;

wherein the network token operations further comprise:

burning the at least one token from the receiving wallet address in response to the transfer confirmation.

11. A multi-blockchain system to perform at least one operation between a first user, associated with a sending entity platform of a first entity, and a second user, associated with a receiving entity platform of a second entity, wherein the first entity is different from the second entity, the system comprising:

a distributed common entity platform on a first network;

a distributed crypto-ledger on a second network managed by the distributed common entity platform; and a processor configured to perform steps to:

receive an electronic transfer instruction associated with a transfer of a quantity of an asset across the first network from the sending entity platform to the receiving entity platform;

wherein the sending entity platform comprises a first plurality of accounts associated with a first plurality of users;

wherein the receiving entity platform comprises a second plurality of accounts associated with a second plurality of users;

wherein the electronic transfer instruction comprises electronic transfer parameters comprising:

a sending network address on the first network associated with a sender of the quantity of the asset on the sending entity platform, the sender comprising at least one of the first plurality of users, a receiving network address on the first network associated with a receiver of the quantity of the asset on the receiving entity platform, the receiver comprising at least one of the second plurality of users, an asset identifier identifying the asset, a quantity value representing the quantity of the asset, and a first function identifier identifying a first function to be performed;

execute a transfer manager self-executing programming object (SEPO) in response to the first function identifier to execute transfer management operations on the distributed crypto-ledger on the second network, wherein the transfer management operations comprise:

generating a second electronic instruction to a network token SEPO in response to address data;

wherein the second electronic instruction comprises:

a second function identifier identifying a second function to be performed;

a sending wallet network address associated with the sending network address;

a receiving wallet network address associated with the receiving network address;

the asset identifier, and the quantity value;

execute the network token SEPO in response to the second function identifier of the second instruction to execute network token operations on the distributed crypto-ledger;

wherein the network token operations comprise:

automatically minting at least one token in a sending wallet associated with the sending wallet network address, wherein the at least one token comprises a tokenized version of the quantity of the asset based at least in part on the asset identifier and the quantity value, and performing at least one first distributed crypto-ledger transfer of the at least one token from the sending wallet to a receiving wallet associated with the receiving wallet network address;

aggregate the at least one first distributed crypto-ledger transfer with at least one additional distributed crypto-ledger transfer between sending entity platform and the receiving entity platform across the second network for at least one first period of time; and automatically trigger, upon the at least one first period of time elapsing and detection of the at least one token being transferred across the second network via the distributed crypto-ledger to the receiving wallet network address, to asynchronously perform an electronic transfer of a net electronic transfer across the first network, the net electronic transfer comprising the quantity of the asset from the sending entity platform to the receiving entity platform across the first network aggregated with at least one other quantity of at least one asset associated with the at least one additional distributed crypto-ledger transfer to complete the first function independently of the distributed crypto-ledger.

12. The multi-blockchain system of claim 11, wherein the processor is further configured to: execute the transfer manager SEPO to execute transfer management operations comprising:

generating a third instruction comprising third instruction parameters; wherein the third instruction parameters comprise:

the sending address, the receiving address, and a third function identifier identifying a third function to be performed;

execute an address SEPO in response to the third function identifier of the third instruction to execute address verification operations on the distributed crypto-ledger;

wherein the address verification operations comprise:

accessing an address log associated with the distributed crypto-ledger, verifying the sending address and the receiving address based at least in part on the address log, and returning address data associated with the distributed crypto-ledger, the address data comprising:

the sending wallet address associated with the sending address and the receiving wallet address associated with the receiving address.

13. The multi-blockchain system of claim 11, wherein the transfer manager SEPO is further configured to execute transfer management operations on the distributed crypto-ledger, comprising generating a fourth instruction to a settlement manager SEPO;

wherein the fourth instruction comprises:

a fourth function identifier identifying a fourth function to be performed, the sending wallet address, the receiving wallet address, the asset identifier, and the quantity value.

14. The multi-blockchain system of claim 13, wherein the transfer manager SEPO is further configured to execute the settlement manager SEPO in response to the fourth function identifier of the fourth instruction to execute settlement operations on the distributed crypto-ledger;

wherein the settlement operations comprise:

logging a pending settlement representing an awaited transfer of the quantity of the asset matching the at least one token transferred from the sending wallet to the receiving wallet, receiving at least one settlement instruction from at least one settlement system, wherein the at least one settlement instruction instructs the settlement manager SEPO to return the pending settlement; and transmitting the pending settlement to the at least one settlement system to initiate at least one settlement of the at least one token.

15. The multi-blockchain system of claim 14, wherein the transfer manager SEPO is further configured to execute transfer management operations on the distributed crypto-ledger, comprising:

receiving a transfer confirmation from the receiving entity platform, wherein the transfer confirmation confirms the transfer of the quantity of the asset from the sending address to the receiving address; and generating a fifth instruction to the network token SEPO based on the transfer confirmation;

wherein the fifth instruction comprises:

a fifth function identifier identifying a fifth function to be performed, the sending wallet address, the receiving wallet address, the asset identifier, and the quantity value.

16. The multi-blockchain system of claim 15, further configured to execute the network token SEPO in response to the fifth function identifier of the fifth instruction to further execute the network token operations on the distributed crypto-ledger;

wherein the network token operations further comprise:

burning the at least one token from the receiving wallet address in response to the transfer confirmation.

17. A method comprising:

receiving, by at least one processor of a distributed common entity platform, an electronic transfer instruction associated with a transfer of a quantity of an asset across a first network from a sending entity platform to a receiving entity platform;

wherein the sending entity platform comprises a first plurality of accounts associated with a first plurality of users;

wherein the receiving entity platform comprises a second plurality of accounts associated with a second plurality of users;

wherein the electronic transfer instruction comprises electronic transfer parameters comprising:

a sending network address on the first network associated with a sender of the quantity of the asset on the sending entity platform, the sender comprising at least one of the first plurality of users, a receiving network address on the first network associated with a receiver of the quantity of the asset on the receiving entity platform, the receiver comprising at least one of the second plurality of users, an asset identifier identifying the asset;

a quantity value representing the quantity of the asset, and a first function identifier identifying a first function to be performed;

executing, by the at least one processor, a transfer manager self-executing programming object (SEPO) in response to the first function identifier to execute transfer management operations on a distributed crypto-ledger on a second network, managed by the distributed common entity platform, wherein the transfer management operations comprise:

generating a second electronic instruction to a network token SEPO in response to address data, wherein the second instruction comprises:

a second function identifier identifying a second function to be performed, a sending wallet network address associated with the sending network address, a receiving wallet network address associated with the receiving network address, the asset identifier, and the quantity value;

executing, by the at least one processor, the network token SEPO in response to the second function identifier of the second instruction to execute network token operations on the distributed crypto-ledger; wherein the network token operations comprise:

automatically minting at least one token in a sending wallet associated with the sending wallet network address, wherein the at least one token comprises a tokenized version of the quantity of the asset based at least in part on the asset identifier and the quantity value, and performing at least one first distributed crypto-ledger transfer of the at least one token from the sending wallet to a receiving wallet associated with the receiving wallet network address;

aggregating, by the at least one processor, the at least one first distributed crypto-ledger transfer with at least one additional distributed crypto-ledger transfer between sending entity platform and the receiving entity platform across the second network for at least one first period of time; and automatically triggering, by the at least one processor, upon the at least one first period of time elapsing and detection of the at least one token being transferred across the second network via the distributed crypto-ledger to the receiving wallet network address, to asynchronously perform an electronic transfer of a net electronic transfer across the first network, the net electronic transfer comprising the quantity of the asset from the sending entity platform to the receiving entity platform across the first network aggregated with at least one other quantity of at least one asset associated with the at least one additional distributed crypto-ledger transfer to complete the first function independently of the distributed crypto- ledger.

18. The method of claim 17 further comprising:

executing, by the at least one processor, the transfer manager SEPO to execute transfer management operations further comprising:

generating a second instruction comprising second instruction parameters, wherein the second instruction parameters comprise a sending address, a receiving address, and a second function identifier identifying a second function to be performed;

executing, by the at least one processor, an address SEPO in response to second function identifier of the second instruction to execute address verification operations on the distributed crypto-ledger, wherein the address verification operations comprise:

accessing an address log associated with the distributed crypto-ledger, verifying the sending address and the receiving address based at least in part on the address log, and returning address data associated with the distributed crypto-ledger, the address data comprising:

the sending wallet address associated with the sending address and the receiving wallet address associated with the receiving address.

19. The method of claim 17 wherein the transfer manager SEPO is further configured to execute transfer management operations on the distributed crypto-ledger, comprising:

generating a fourth instruction to a settlement manager SEPO;

wherein the fourth instruction comprises:

a fourth function identifier identifying a fourth function to be performed, the sending wallet address, the receiving wallet address, the asset identifier, and the quantity value.

20. The method of claim 19 comprising executing, by the at least one processor, the settlement manager SEPO in response to the fourth function identifier of the fourth instruction to:

execute settlement operations on the distributed crypto-ledger; wherein the settlement operations comprise:

logging a pending settlement representing an awaited transfer of the quantity of the asset matching the at least one token transferred from the sending wallet to the receiving wallet, receiving at least one settlement instruction from at least one settlement system, wherein the at least one settlement instruction instructs the settlement manager SEPO to return the pending settlement; and transmitting the pending settlement to the at least one settlement system to initiate at least one settlement of the at least one token.

21. The method of claim 20 wherein the transfer manager SEPO is further configured to execute transfer management operations on the distributed crypto-ledger, comprising:

receiving a transfer confirmation from the receiving entity platform, wherein the transfer confirmation confirms the transfer of the quantity of the asset from the sending address to the receiving address;

generating a fifth instruction to the network token SEPO based on the transfer confirmation;

wherein the fifth instruction comprises:

a fifth function identifier identifying a fifth function to be performed, the sending wallet address, the receiving wallet address, the asset identifier, and the quantity value.

22. The method of claim 21, further comprising executing, by the at least one processor, the network token SEPO in response to the fifth function identifier of the fifth instruction to further execute the network token operations on the distributed crypto-ledger;

wherein the network token operations further comprise:

burning the at least one token from the receiving wallet address in response to the transfer confirmation.

* * * * *